US008579105B2

(12) United States Patent
Butler et al.

(10) Patent No.: US 8,579,105 B2
(45) Date of Patent: Nov. 12, 2013

(54) ROLLER CONVEYOR SYSTEM AND AXLE RETAINER FOR USE IN MOUNTING THE ROLLERS

(71) Applicant: Dematic Corp., Grand Rapids, MI (US)

(72) Inventors: Floyd W. Butler, Newaygo, MI (US); Paul L. Wetters, Rockford, MI (US); Paul Kreys, Grand Rapids, MI (US); Kenneth J. Kooistra, Byron Center, MI (US); Dennis J. Schuitema, Ada, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 13/904,728

(22) Filed: May 29, 2013

(65) Prior Publication Data

US 2013/0256094 A1 Oct. 3, 2013

Related U.S. Application Data

(63) Continuation of application No. 12/942,572, filed on Nov. 9, 2010, now Pat. No. 8,469,178.

(60) Provisional application No. 61/323,131, filed on Apr. 12, 2010, provisional application No. 61/281,128, filed on Nov. 13, 2009.

(51) Int. Cl.
*B65G 13/00* (2006.01)

(52) U.S. Cl.
USPC .............. 198/861.1; 198/860.1; 198/782; 193/35 R; 193/37

(58) Field of Classification Search
USPC .......... 198/861.1, 860.1, 782, 351, 352, 368, 198/370.06, 370.07, 370.08, 457.06, 597, 198/598; 193/35 R, 37, 35 C, 35 MD
See application file for complete search history.

(56) References Cited

U.S. PATENT DOCUMENTS 1,795,192 A * 3/1931 York ........................ 193/35 R
1,917,004 A 7/1933 Worrall
(Continued)

FOREIGN PATENT DOCUMENTS

DE 4439107 A1 5/1996
EP 1260467 A1 11/2002
JP 57151529 A 9/1982

OTHER PUBLICATIONS

International Search Report (Form PCT/ISA/210) and Written Opinion of the International Searching Authority (Form PCT/ISA/237) from corresponding Patent Cooperation Treaty Application No. PCT/US2010/055990, mailed Jan. 4, 2011.

(Continued)

*Primary Examiner* — Patrick Mackey
(74) *Attorney, Agent, or Firm* — Gardner, Linn, Burkhart & Flory, LLP

(57) ABSTRACT

A conveyor system includes a conveying surface for conveying articles as defined by a plurality of rollers and a frame. Each of the rollers has an axle. The frame is made up of at least two frame members that are spaced apart a distance that corresponds with a length of at least one of the plurality of rollers. A plurality of axle retainers is connected with at least one of the frame members. Each of the axle retainers has a base and a plurality of axle retaining openings that are each adapted to receiving an axle at an end of one of the rollers. At least two of the openings are fixedly at different angles to the base. In this manner, the axle retainers are capable of mounting the rollers at more than one angle with respect to the at least one of the frame members as determined by which of the axle-retaining openings receives the axle. Each roller-mounting angle corresponds to a different orientation of the base with respect to the at least one of the frame members.

15 Claims, 29 Drawing Sheets

(56) References Cited

U.S. PATENT DOCUMENTS

| | | | |
|---|---|---|---|
| 2,624,445 A | | 1/1953 | Wallman |
| 3,045,792 A | | 7/1962 | Greller |
| 3,093,236 A | | 6/1963 | McLaughlin |
| 3,232,417 A | | 2/1966 | Muller |
| 3,343,639 A | | 9/1967 | Eliassen et al. |
| 3,382,964 A | * | 5/1968 | Bonhoff et al. ............. 198/415 |
| 3,429,417 A | | 2/1969 | De Good et al. |
| 3,463,297 A | * | 8/1969 | Morgan ..................... 198/782 |
| 3,512,638 A | | 5/1970 | Chengges et al. |
| 3,763,992 A | * | 10/1973 | Klenk ......................... 198/785 |
| 3,799,325 A | | 3/1974 | Benson |
| 3,983,988 A | | 10/1976 | Maxted et al. |
| 4,056,180 A | * | 11/1977 | Gunti .......................... 193/35 J |
| 4,111,412 A | * | 9/1978 | Cathers ....................... 271/251 |
| 4,200,178 A | | 4/1980 | Gunti |
| 4,232,774 A | * | 11/1980 | Gunti .......................... 193/35 J |
| 4,241,825 A | * | 12/1980 | Brouwer ..................... 198/782 |
| 4,243,131 A | * | 1/1981 | Young ...................... 193/35 MD |
| 4,313,536 A | | 2/1982 | Fauth |
| 4,498,576 A | | 2/1985 | Anderson |
| 4,509,636 A | | 4/1985 | Godbois |
| 4,693,356 A | * | 9/1987 | Pi-May ...................... 193/35 TE |
| 4,792,034 A | | 12/1988 | Leemkuil |
| 5,048,665 A | | 9/1991 | Vickers |
| 5,582,286 A | | 12/1996 | Kalm et al. |
| 5,657,854 A | * | 8/1997 | Chen et al. ..................... 198/787 |
| 5,971,132 A | | 10/1999 | Bonnet |
| 6,161,681 A | | 12/2000 | Kalm |
| 6,253,909 B1 | | 7/2001 | Kalm et al. |
| 6,286,660 B1 | * | 9/2001 | Kalm ........................... 198/782 |
| 6,367,617 B1 | * | 4/2002 | Schiesser et al. ............. 198/782 |
| 6,419,070 B1 | | 7/2002 | Agnoff |
| 6,585,107 B1 | | 7/2003 | Specht |
| 6,622,853 B2 | * | 9/2003 | Bond et al. ................... 198/782 |
| 6,685,008 B2 | * | 2/2004 | Schiesser et al. ............. 198/782 |
| 6,962,250 B2 | | 11/2005 | Van Liempd et al. |
| 7,243,784 B2 | * | 7/2007 | Cotter et al. ................ 198/861.1 |
| 7,540,375 B2 | | 6/2009 | Freudelsperger |
| 7,588,135 B1 | * | 9/2009 | Chuang ...................... 193/35 R |
| 7,690,497 B2 | | 4/2010 | Radwallner et al. |
| 8,196,736 B2 | | 6/2012 | Wagner |
| 2002/0060139 A1 | * | 5/2002 | Schiesser et al. ............. 198/782 |
| 2006/0254880 A1 | | 11/2006 | Van Schaijk et al. |
| 2007/0034478 A1 | | 2/2007 | Wolf |
| 2008/0245641 A1 | * | 10/2008 | Schroeder .................. 198/861.1 |
| 2010/0006393 A1 | | 1/2010 | LeCroy |

OTHER PUBLICATIONS

International Preliminary Report on Patentability from corresponding Patent Cooperation Treaty Patent Application No. PCT/US2010/055990 mailed May 24, 2012.

* cited by examiner

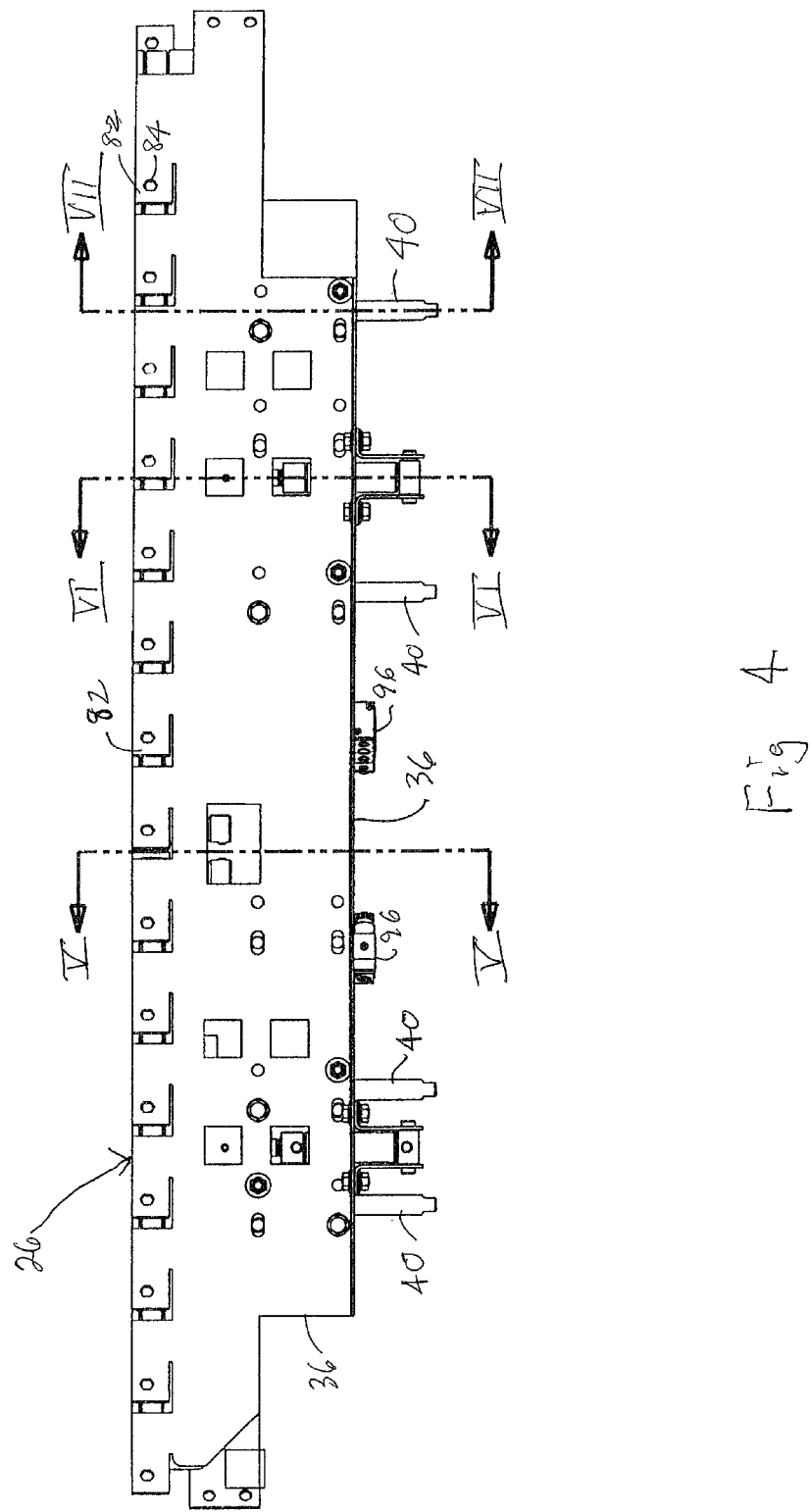

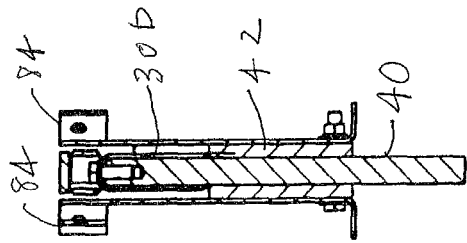
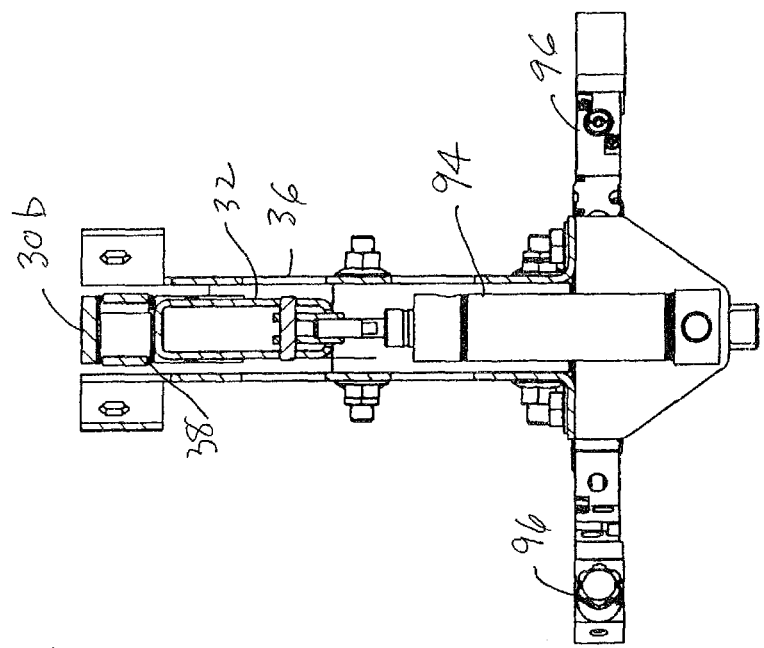
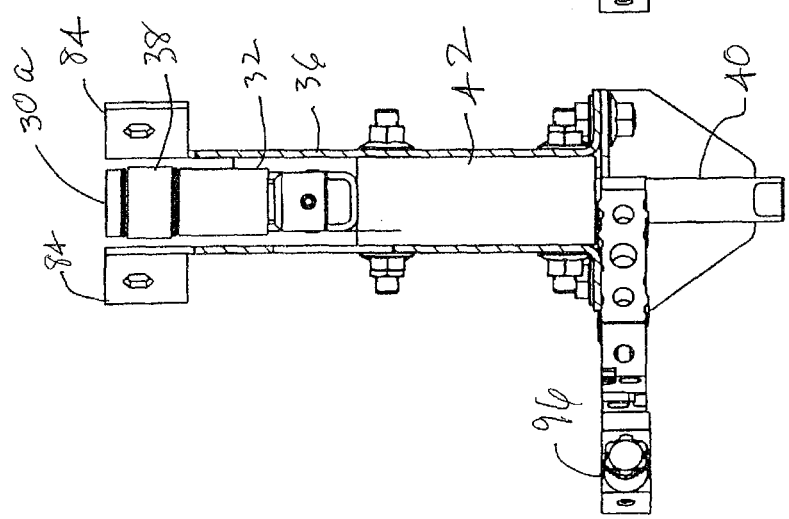

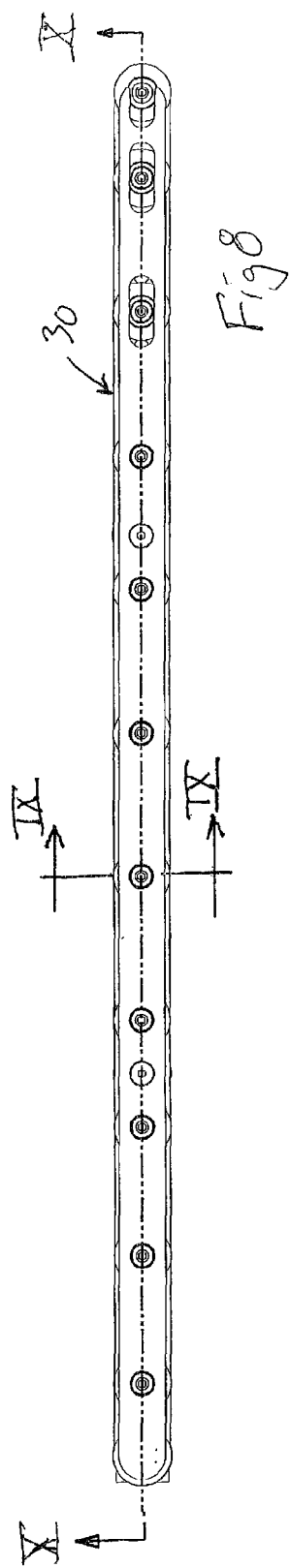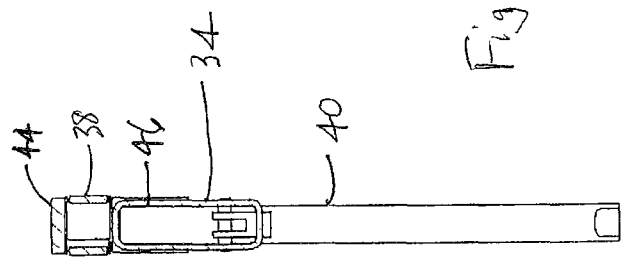

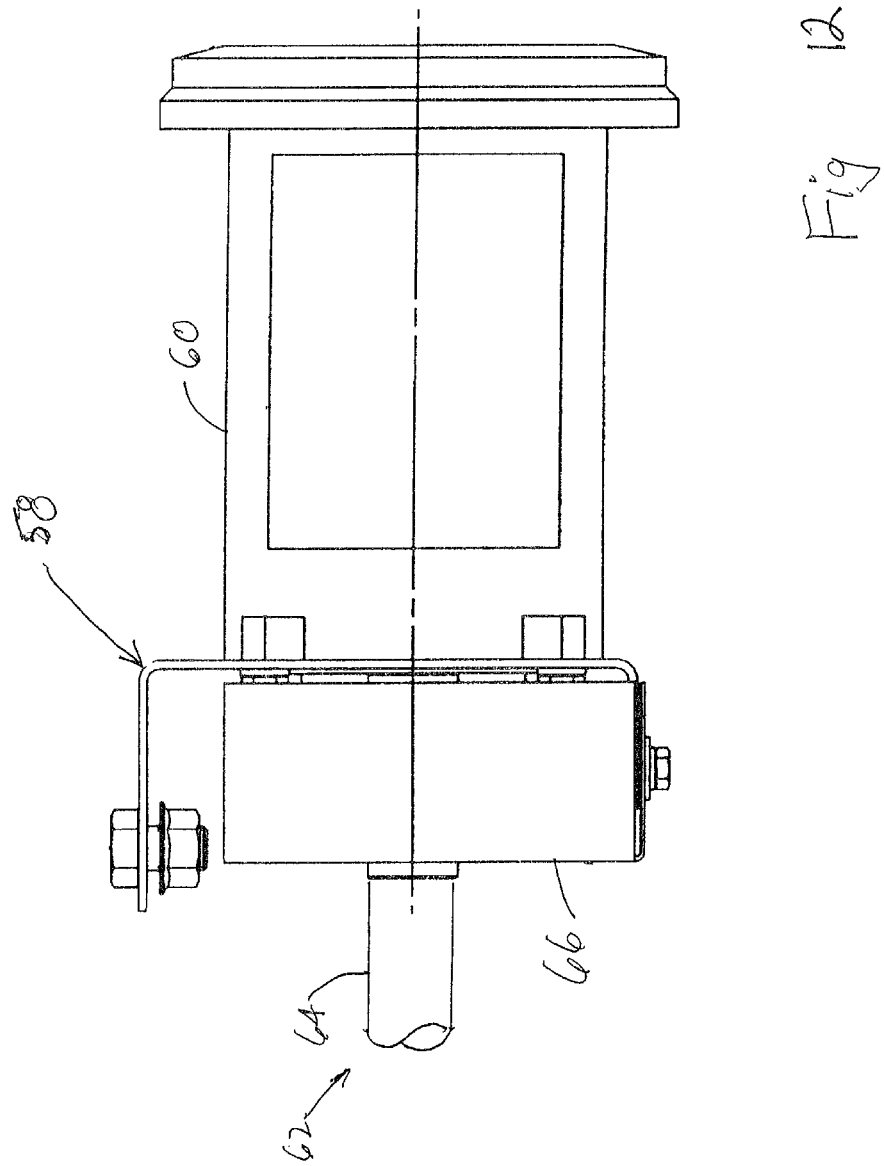

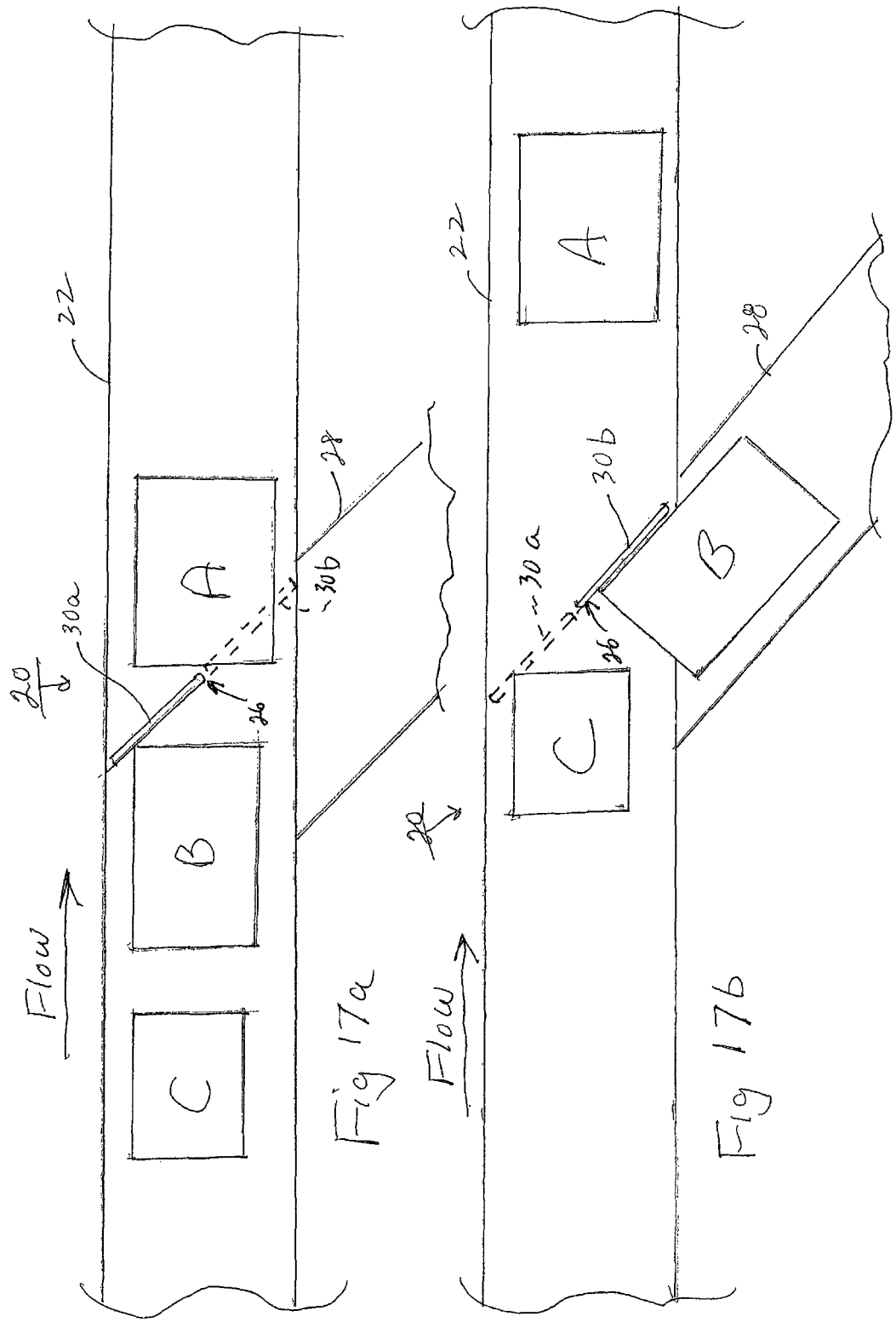

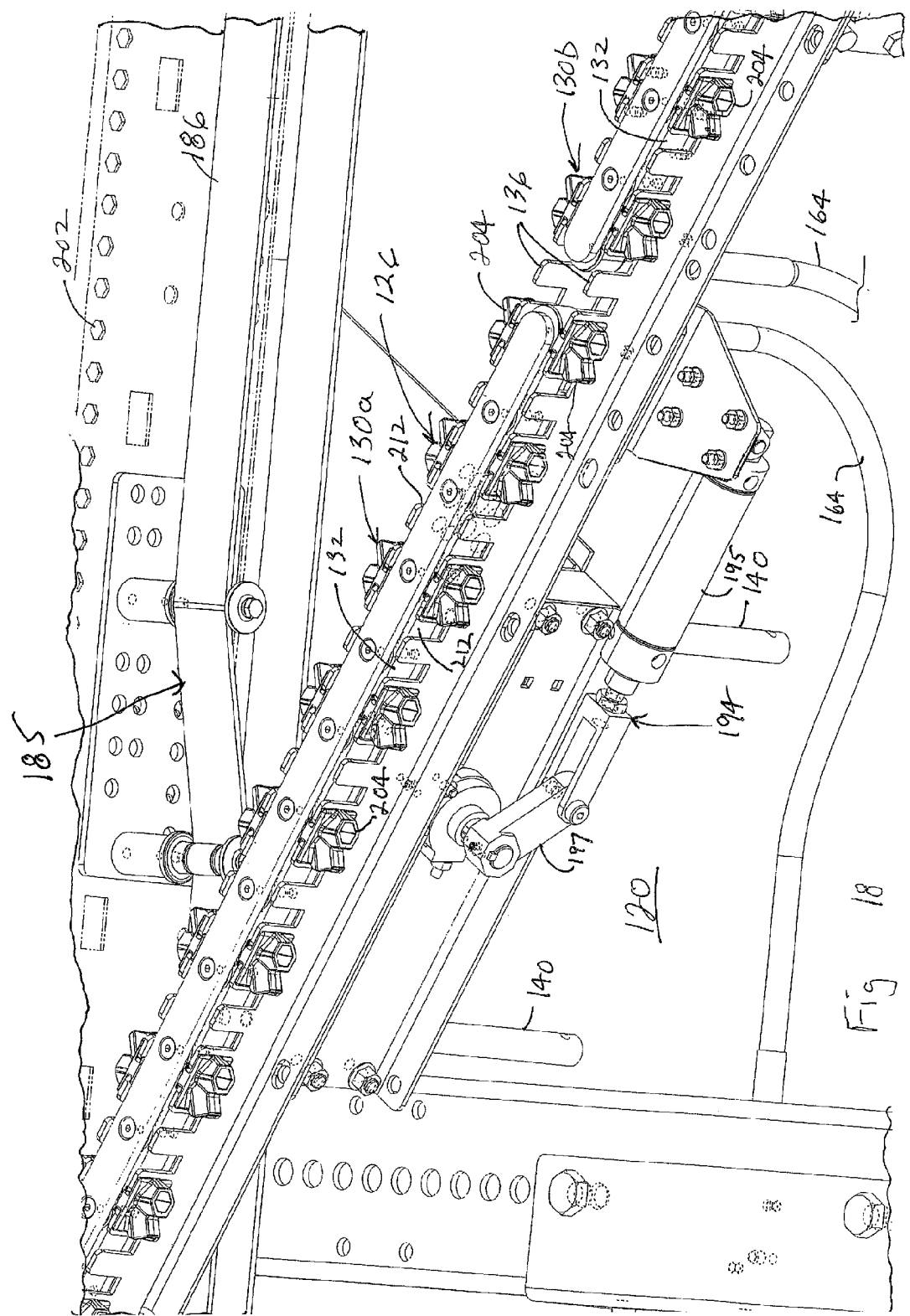

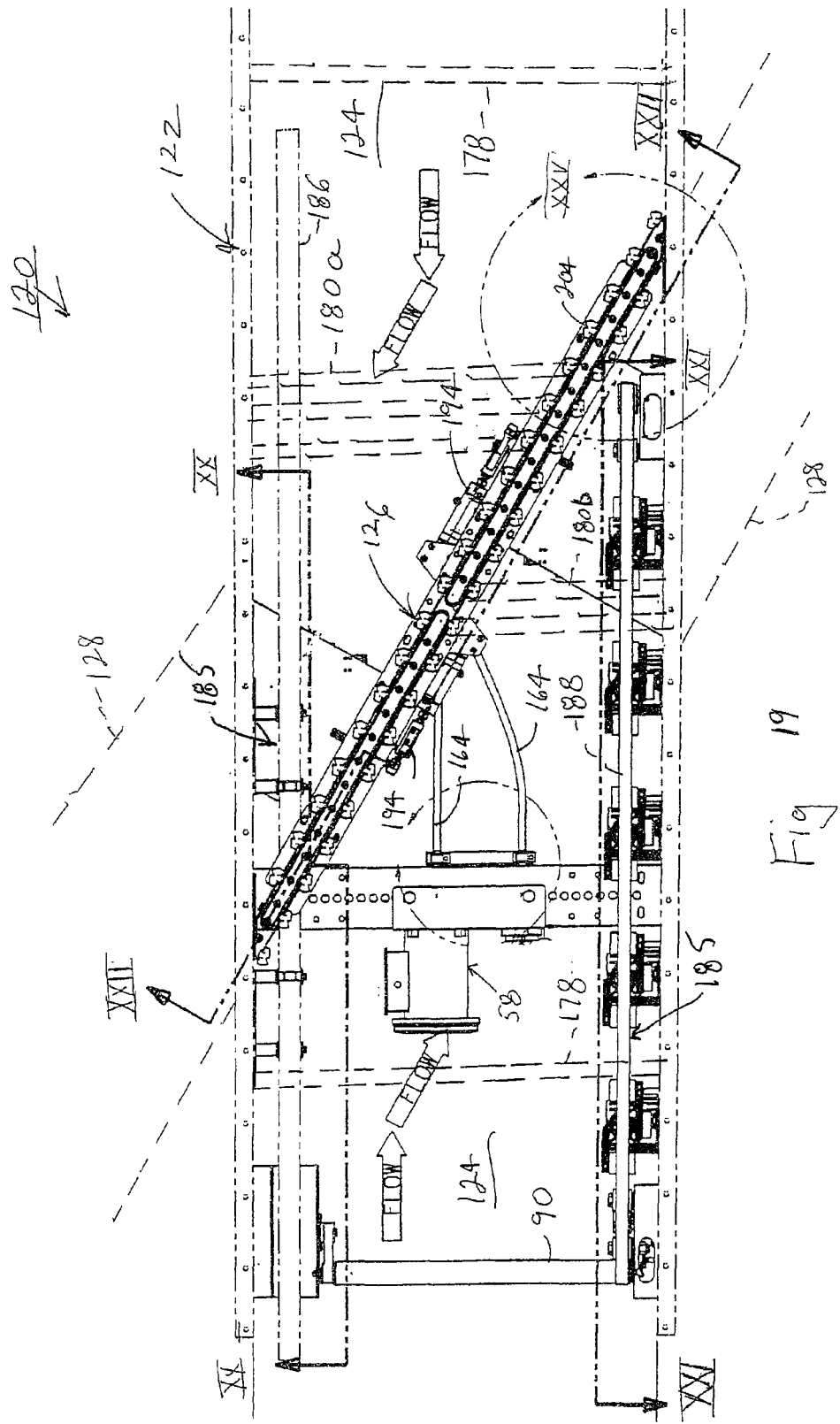

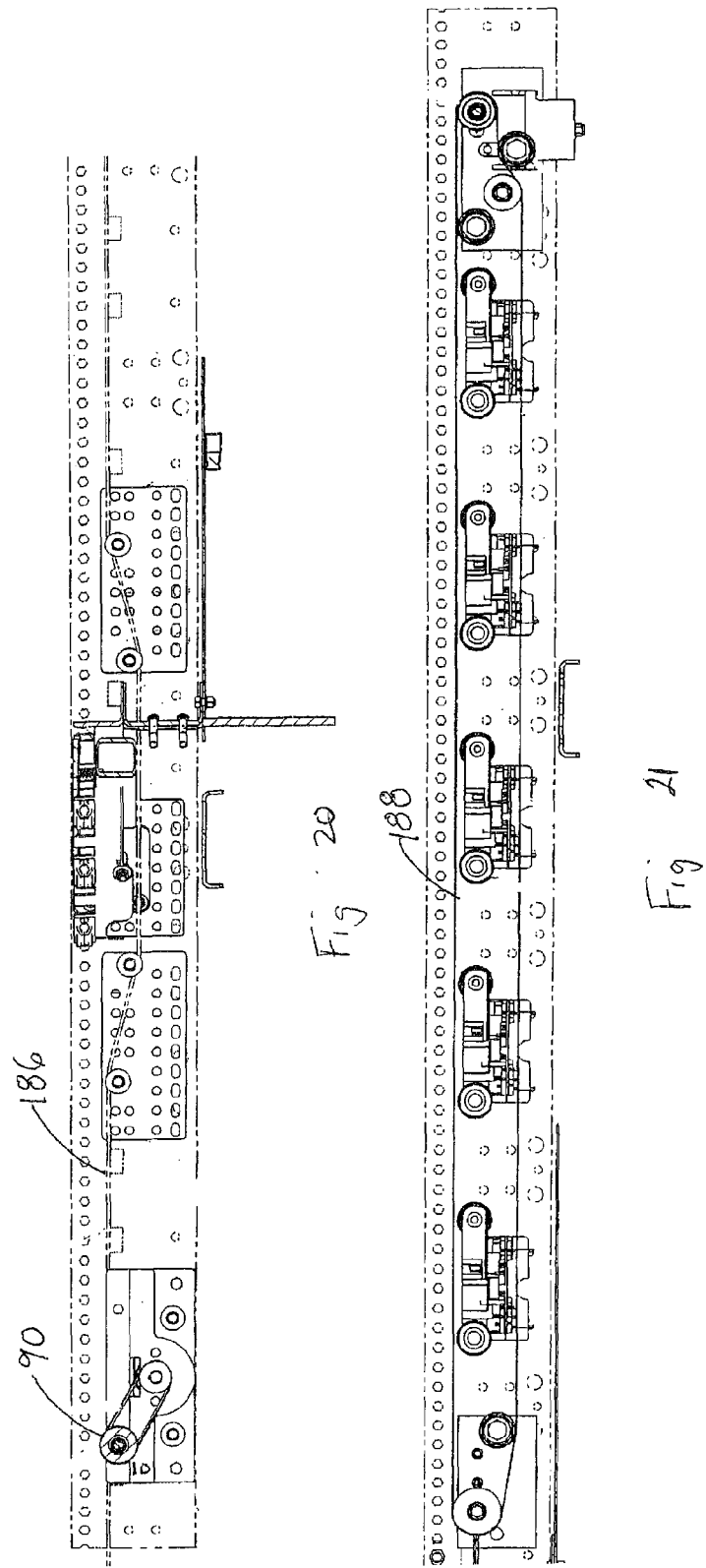

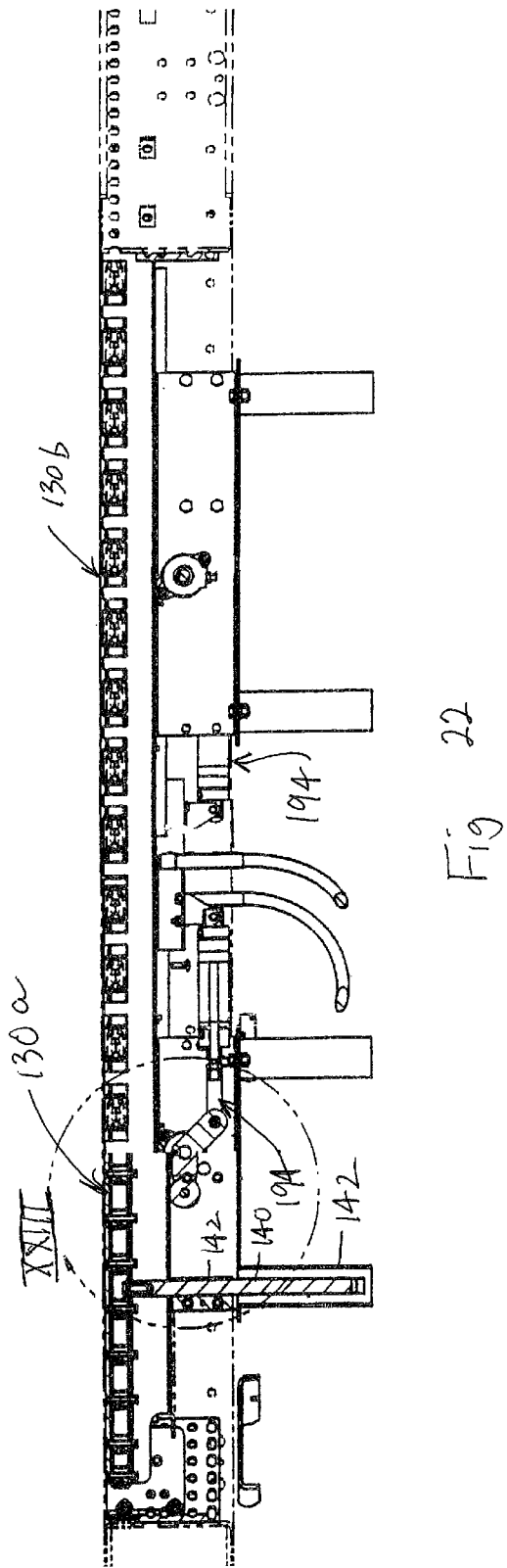

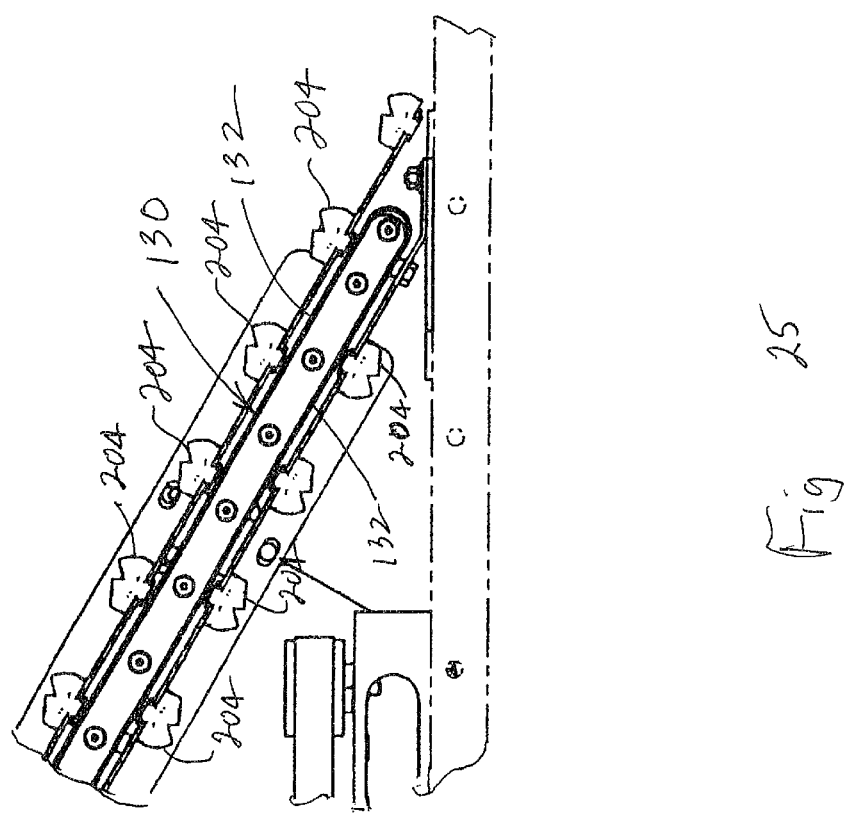

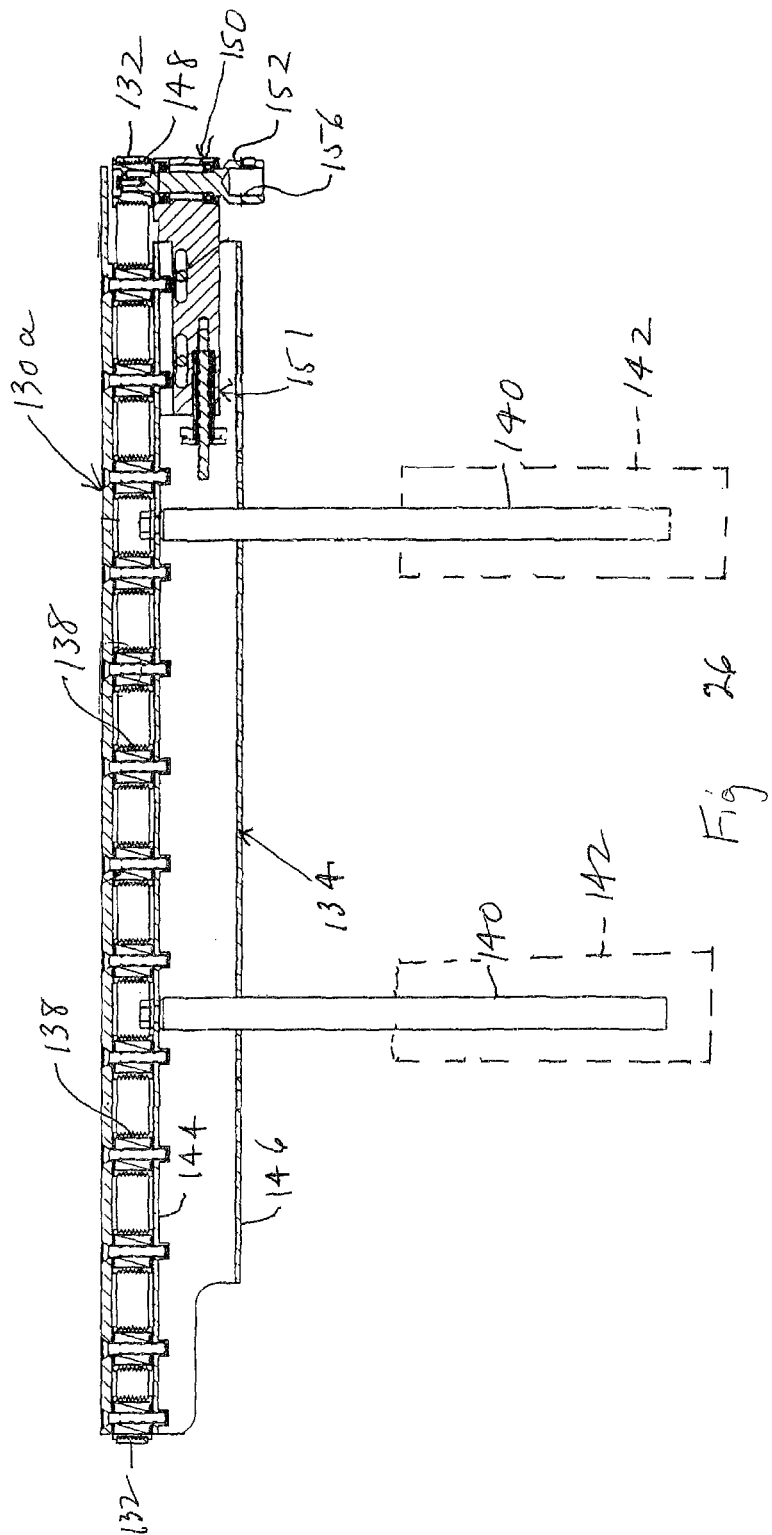

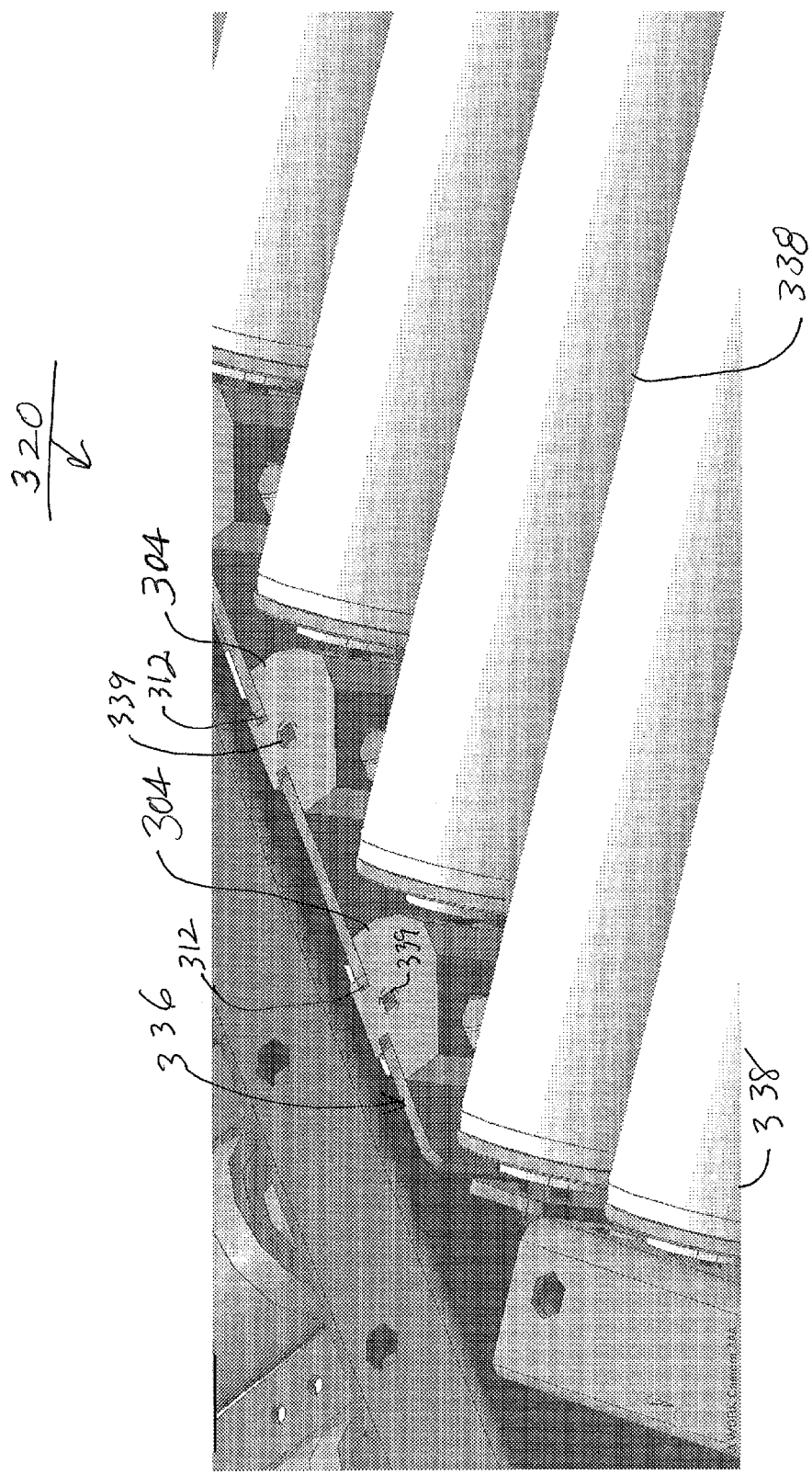

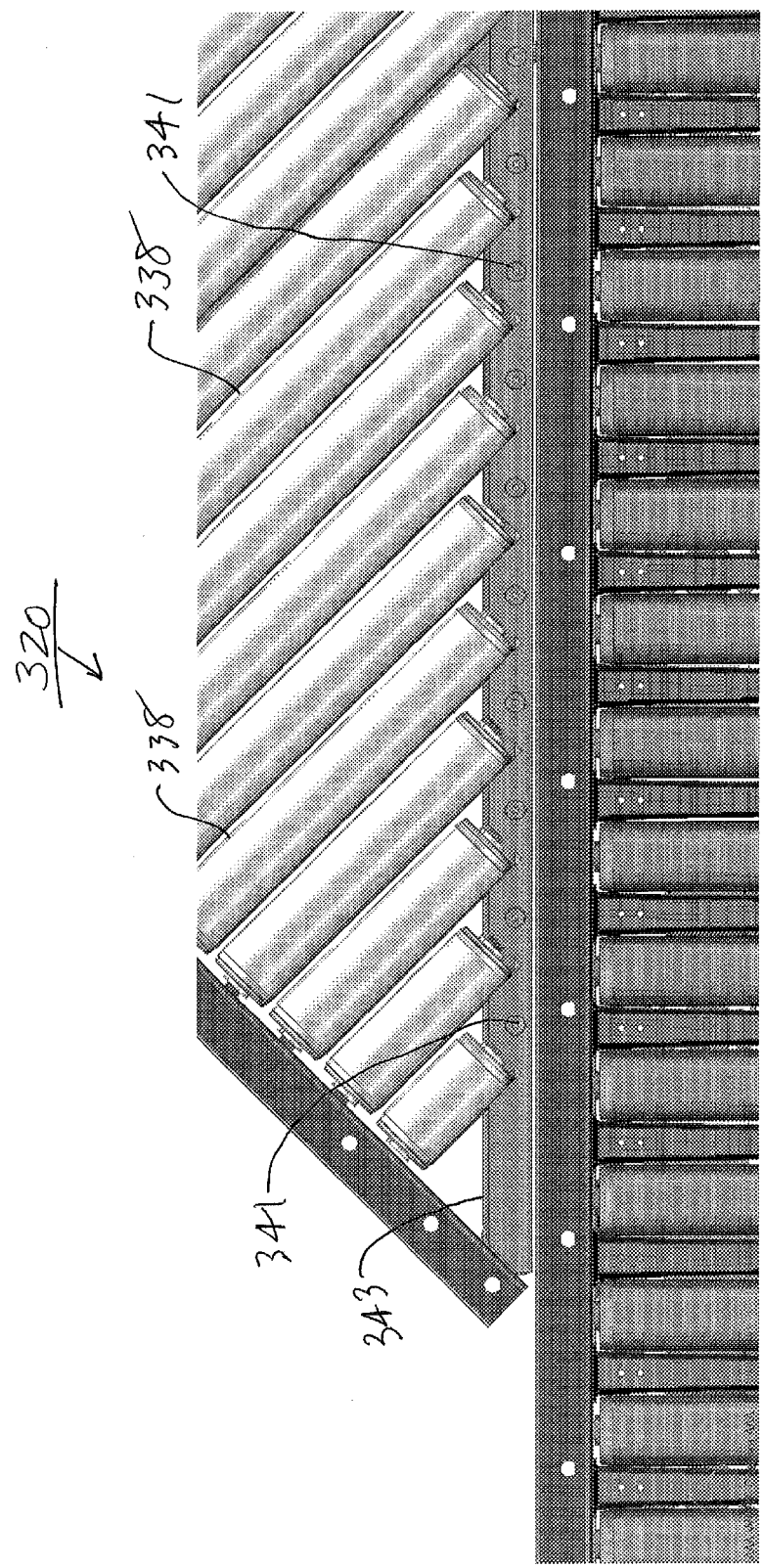

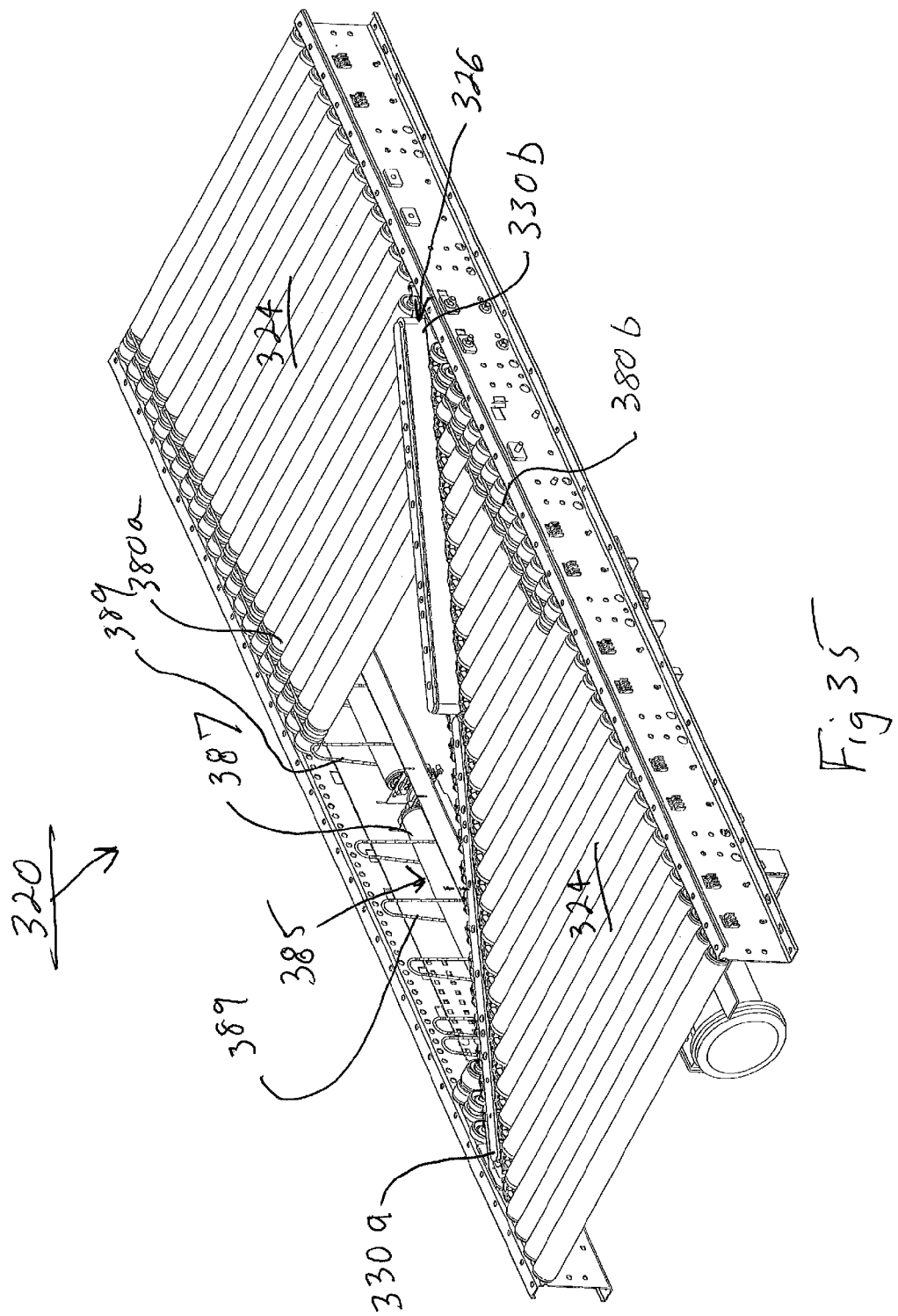

ROLLER CONVEYOR SYSTEM AND AXLE RETAINER FOR USE IN MOUNTING THE ROLLERS

CROSS-REFERENCE TO RELATED APPLICATION

This present application is a continuation of U.S. patent application Ser. No. 12/942,572, filed on Nov. 9, 2010, which claims priority from U.S. provisional patent application Ser. No. 61/281,128, filed on Nov. 13, 2009, and U.S. provisional patent application Ser. No. 61/323,131, filed on Apr. 12, 2010, the disclosures of which are hereby incorporated herein by reference in their entirety.

BACKGROUND OF THE INVENTION

The present invention is directed to a conveyor system and axle retainer and, in particular, to a conveyor system having a conveying surface made up of rollers and an axle retainer for retaining an axle of a roller to a frame member at an angle.

Laterally displacing conveyor systems laterally displace articles travelling on a conveying surface. One such conveyor system is a sortation system that diverts articles off the conveying surface to a select spur. The spur can be a powered takeaway conveyor, gravity takeaway conveyor, chute, or the like. One type of sortation system is a positive displacement sorter. A positive displacement sorter utilizes some type of member to affirmatively guide the article being diverted off of the conveying surface in a manner that reduces the likelihood that an article could overshoot the diverter and, therefore, fail to be diverted. Divert failures are detrimental to efficient operation of the sortation system.

SUMMARY OF THE INVENTION

A conveyor system, according to an aspect of the invention, includes a conveying surface for conveying articles as defined by a plurality of rollers and a frame. Each of the rollers has an axle. The frame is made up of at least two frame members that are spaced apart a distance that corresponds with a length of at least one of the plurality of rollers. A plurality of axle retainers is connected with at least one of the frame members. Each of the axle retainers has a base and a plurality of axle retaining openings that are each adapted to receiving an axle at an end of one of the rollers. At least two of the openings are fixedly at different angles to the base. In this manner, the axle retainers are capable of mounting the rollers at more than one angle with respect to the at least one of the frame members as determined by which of the axle retaining openings receives the axle. Each roller mounting angle corresponds to a different orientation of the base with respect to the at least one of the frame members.

The axle retainers and the at least one of the frame members may have complimentary configurations that allow the axle retainers to be mounted at different orientations to the frame to change which of the retaining openings is used to retain one of the axles. The complementary configurations may be T-shaped extensions of the axle retainers and vertical slots in the at least one of the frame members to receive the extensions. The T-shaped extensions may be press-fit into the slots in order to maintain the axle retainers connected to the at least one of the frame members.

A vertically reciprocating diverter may reciprocate between a non-diverting position below the conveying surface and a diverting position at least partially above the conveying surface. The at least one of the frame members may extend along at least one side of the diverter, wherein the diverter can be mounted at different angles with respect to the conveying rollers.

The rollers may be skewed with respect to both frame members. The conveyor system may be an unscrambling conveyor and/or an aligning conveyor.

Each of said openings may be a hexagonally shaped opening. The axle retainers may be made from a polymeric material.

An axle retainer, according to another aspect of the invention, includes a base and a plurality of axle-retaining openings that are each adapted to receiving an end of an axle. At least two of the openings are fixedly at different angles to the base. In this manner, the axle retainers are capable of mounting rollers at more than one angle to said base as determined by which of said at least two openings is receiving the axle. Which of the at least two openings receiving an axle is determined by an orientation of the base.

Each of the openings may be a hexagonally shaped opening. The axle retainer may be made from a polymeric material. A mounting surface of the base may be in opposition from the openings. The mounting surface may be defined by extensions of the base. The extensions may be T-shaped extensions.

These and other objects, advantages and features of this invention will become apparent upon review of the following specification in conjunction with the drawings.

BRIEF DESCRIPTION OF THE DRAWINGS

FIG. 4 is a side elevation of a diverting assembly;

FIG. 5 is a sectional view taken along the lines V-V in FIG. 4;

FIG. 6 is a sectional view taken along the lines VI-VI in FIG. 4;

FIG. 7 is a sectional view taken along the lines VII-VII in FIG. 4;

FIG. 8 is a top plan view of a diverting member;

FIG. 9 is a sectional view taken along the lines IX-IX in FIG. 8;

FIG. 12 is a side elevation of the propulsion system in FIG. 11;

FIGS. 17*a* and 17*b* illustrate a mode of operation of an embodiment of the invention;

FIG. 18 is the same view as FIG. 2 of an alternative embodiment of a conveyor system with a portion of the conveying surface removed to reveal internal details thereof;

FIG. 19 is a top plan view of the conveyor system in FIG. 18;

FIG. 20 is a sectional view taken along the lines XX-XX in FIG. 19;

FIG. 21 is a sectional view taken along the lines XXI-XXI in FIG. 19;

FIG. 22 is a sectional view taken along the lines XXII-XXII in FIG. 19;

FIG. 25 is an enlarged top plan view of the area indicated at XXV in FIG. 19;

FIG. 26 is a side elevation of a diverting member;

FIG. 31 is a perspective view of an alternative embodiment of a conveyor system;

FIG. 33 is the same view as FIG. 32 showing a finger guard;

FIG. 35 is the same general view as FIG. 2 of yet another alternative embodiment of a conveyor system.

DESCRIPTION OF THE PREFERRED EMBODIMENT

Figure 1:
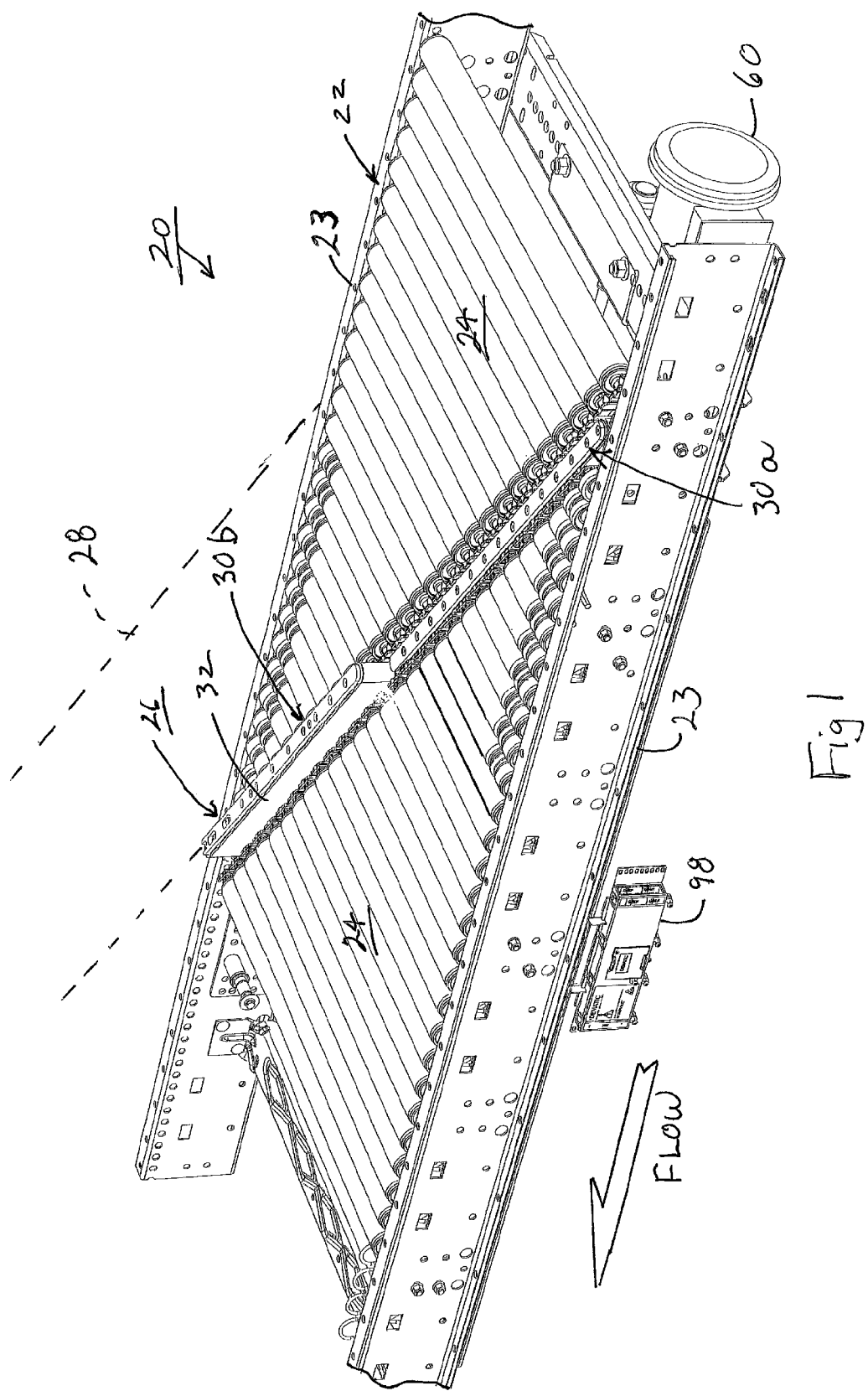
FIG. 1 is a perspective view of a conveyor system according to an embodiment of the invention one diverting assembly in a diverting state and another diverting assembly in a non-diverting state.
Figure 2:
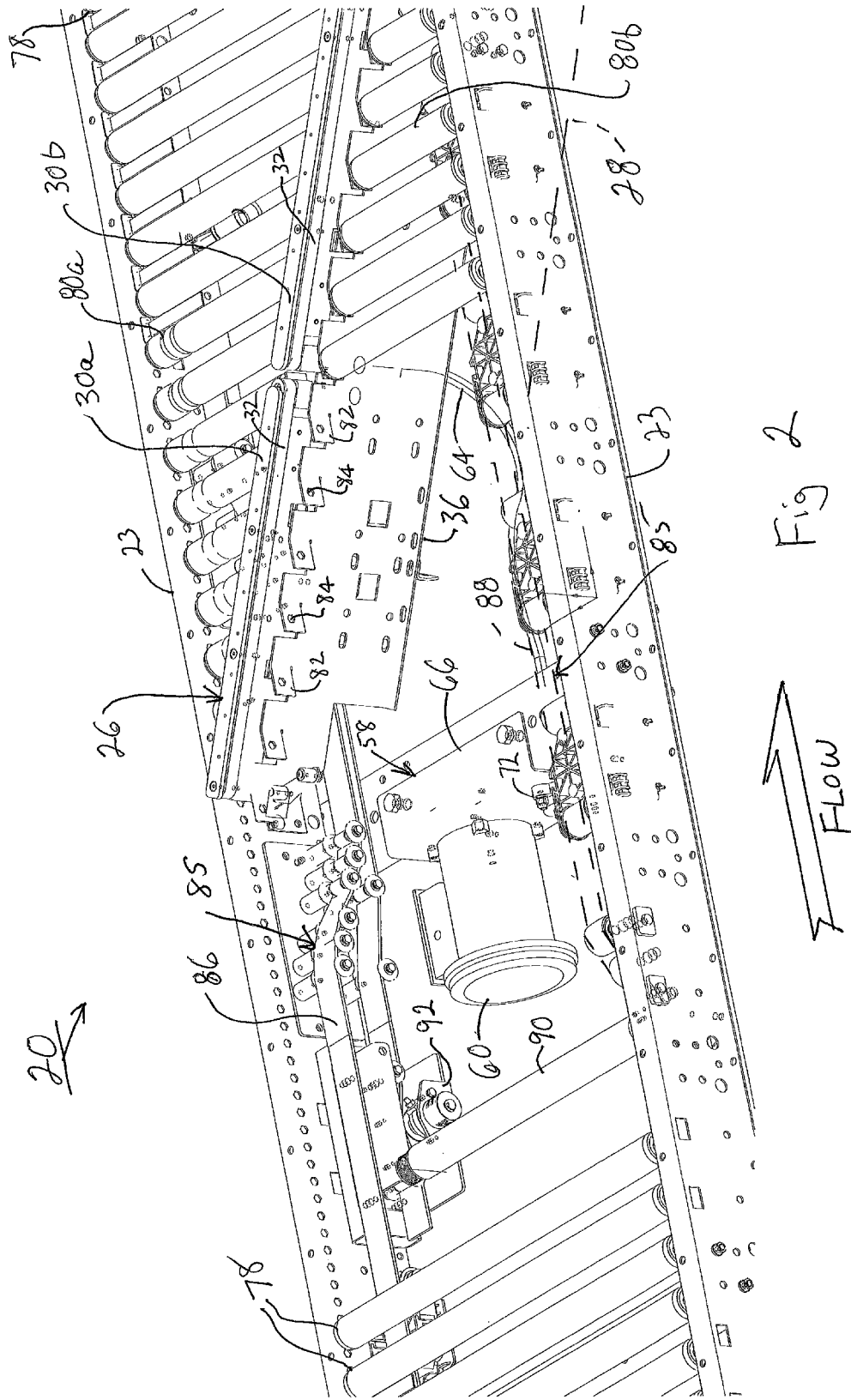
FIG. 2 is a perspective view of the conveying system of FIG. 1 taken from the opposite lateral direction thereof with a portion of the conveying surface removed to reveal internal details thereof.
Figure 3:
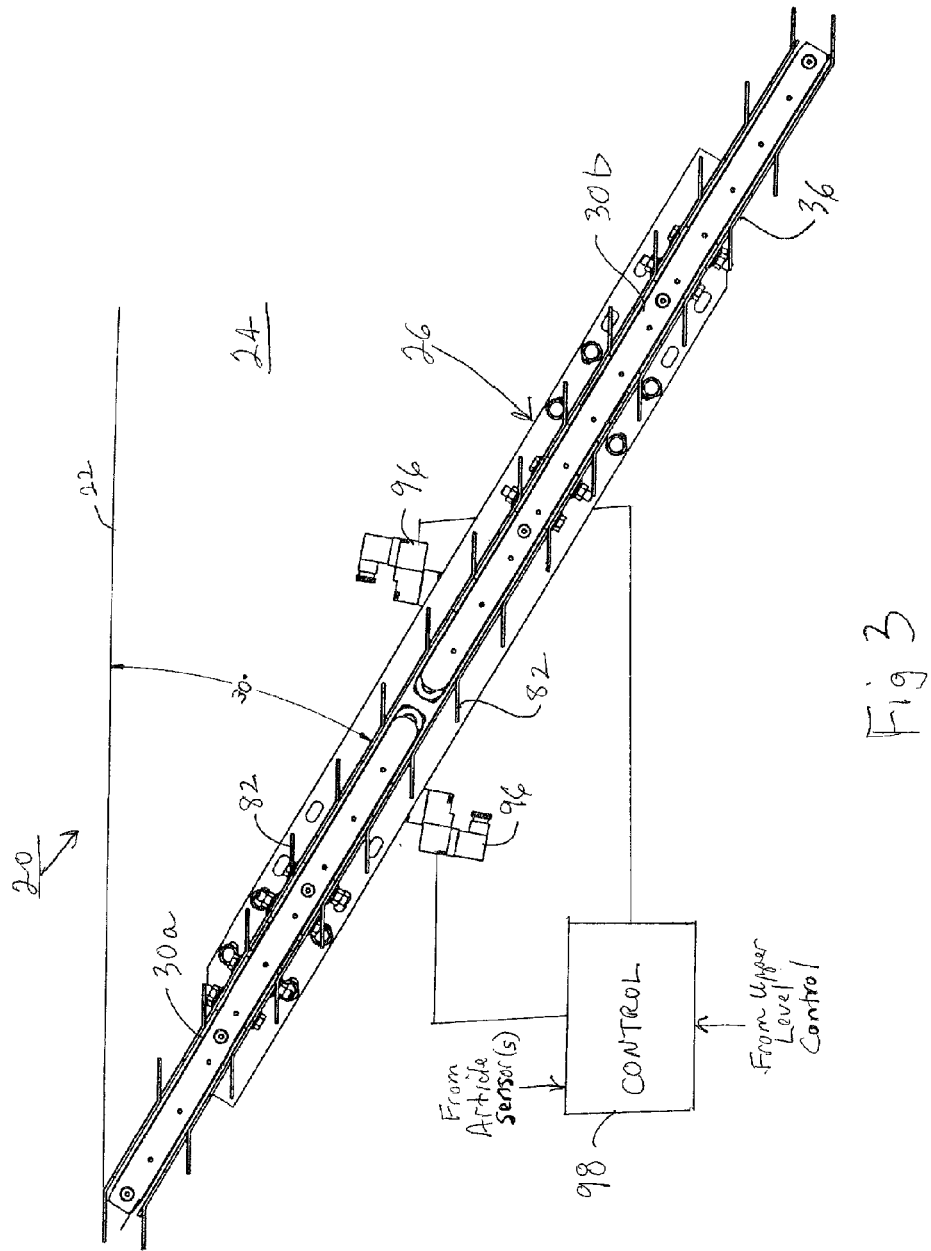
FIG. 3 is a top plan view of the conveyor system in FIG. 1.

Referring now to the drawings and the illustrative embodiments depicted therein a conveyor system 20 includes a conveyor 22 that has a conveying surface 24 for conveying articles in a longitudinal direction and a diverting assembly 26 positioned diagonally across conveying surface 24 (FIGS. 1-16). Diverting assembly 26 travels, or reciprocates, generally vertically between a non-actuated position illustrated in FIG. 1 below conveying surface 24 and an actuated position extending above conveying surface 24. Diverting assembly 26 may be made up of a plurality of diverting members 30a, 30b . . . 30n that are independently actuatable. In FIG. 1, diverting member 30a is shown in a non-actuated position and diverting member 30b is shown in an actuated position. However, diverting assembly 26 may be made up of only one diverting member of a plurality of diverting members that are actuatable in unison. Diverting assembly 26 is configured to laterally displace articles that are being conveyed on conveying surface 24 when the diverting assembly is in its actuated position. It may be used to reposition articles on the conveying surface or, in the embodiment illustrated in FIGS. 1 and 2, it may be used to divert articles off the conveying surface to a takeaway spur, such as a takeaway powered conveyor 28. In the illustrated embodiment, diverting assembly 26 is at an angle of 30 degrees from the longitudinal direction of travel of conveying surface 24, as illustrated in FIG. 3. However, it may be at any desired angle, such as between 20 degrees and 45 degrees, or the like. While conveyor system 20 is illustrated for use with distribution of articles, such as cases of goods being shipped, for example, from warehouses to retail outlets, it can also be used in parcel applications, such as express shipping, as well as user-packed luggage sortation at airports, and the like.

Diverting members 30a, 30b . . . 30n of diverting assembly 26 each have a vertical diverting surface, which may be a powered diverting surface, such as provided by a powered vertically oriented belt 32. Alternatively, diverting member 30 may have a passive diverting surface, such as free-running wheels, an anti-friction surface, or the like. If a powered diverting surface is used, the speed of the diverting surface may have a longitudinal component that has approximately the same speed as that of conveying surface 24 in order to maintain the forward velocity of articles being diverted. Each diverting assembly 26 includes a base 34 that vertically reciprocates in a guide frame 36 and a plurality of rollers 38 supported by base 34. Rollers 38 reeve vertical belt 32 and provide support or backing to the belt when contacted by an article being diverted. Each diverting member 30 includes a plurality of vertically oriented posts 40 extending downwardly from base 34 and a plurality of stationary blocks 42, made from a polymer, such as UHMW, or the like, mounted to guide frame 36, each for facilitating vertical reciprocating motion of one of posts 40. Base 34 includes an upper plate 44 and a lower plate 46 interconnected by one or more sidewalls 47. Each post 40 passes through an opening in lower plate 46 sized just larger than the post and is connected with upper plate 44. This provides spaced apart support to posts 40 to be able to withstand the shock of contact by the articles against diverting member 30. Biasing members, such as extension springs 45, assist in returning diverting member 30 to a non-actuated position.

Figure 10:
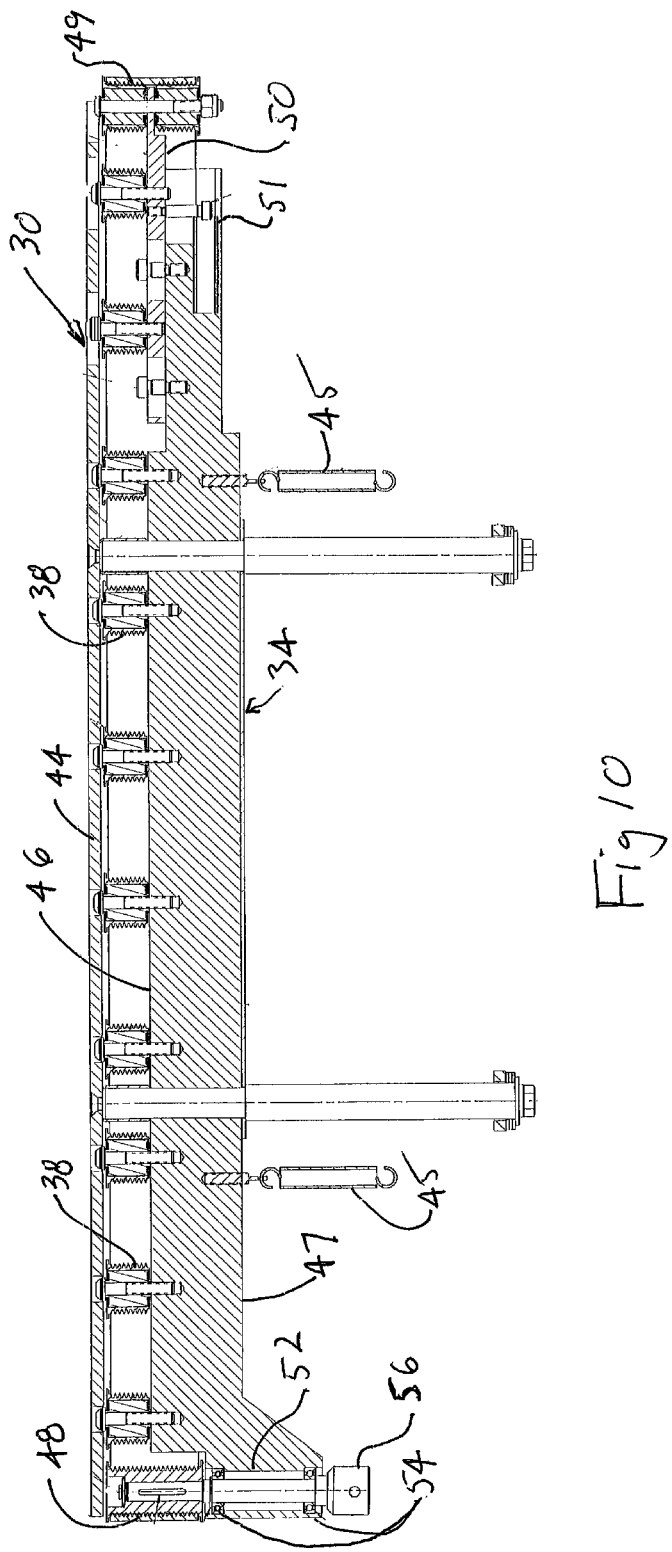
FIG. 10 is a sectional view taken along the lines X-X in FIG. 8.
Figure 11:
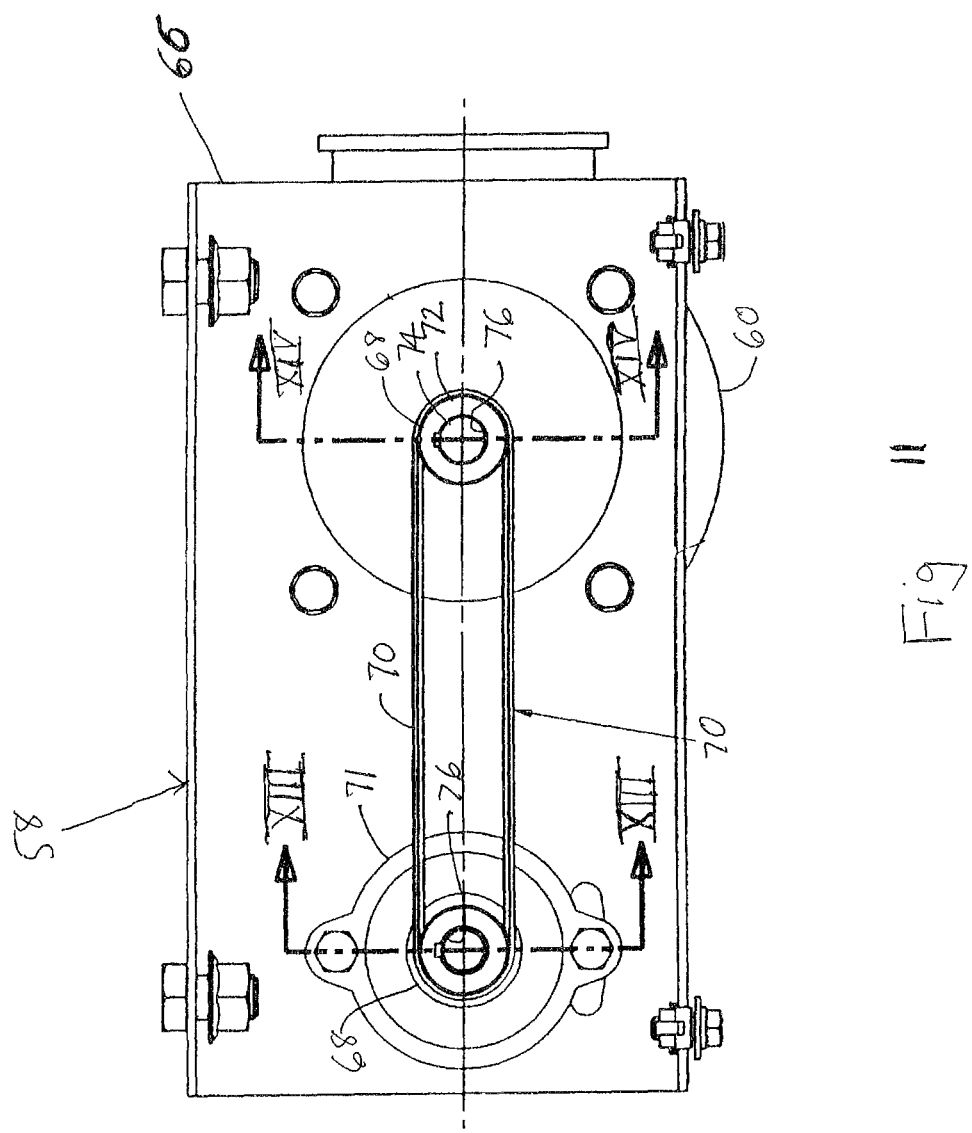
FIG. 11 is an end elevation of a propulsion system.
Figure 14:
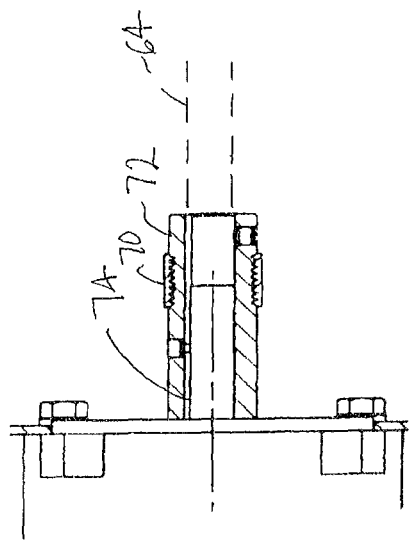
FIG. 14 is a sectional view taken along the lines XIV-XIV in FIG. 11.

Rollers 38 are mounted to upper plate 44, lower plate 46, or both. One of the rollers is a drive roller 48 for propelling belt 32 (FIG. 10). Roller 48 is an extension of a shaft 52 that is rotatably supported by a pair of bearings 54 to sidewall 47. An opposite end of shaft 52 defines a socket 56 whose purpose will be explained in more detail below. Belt 32 is supported by an opposite idler pulley 49 connected with sidewalls 47 by an arm 50. A tensioner, such as a spring, 51 applies outward force on arm 50 in order to apply a tension on belt 32 via idler pulley 49. Roller 48, and, hence, the diverting surface defined by belt 32, is driven by a propulsion system 58. Propulsion system 58 includes a motor 60 and a coupling 62 for coupling motor 60 to roller 48. While motor 60 is illustrated as an AC electric motor that is driven by a variable frequency drive (not shown), it could be a DC electric motor, a pneumatic motor, a hydraulic motor, or the like. Motor 60 is stationary with coupling 62 accommodating relative motion between roller 48 and motor 60 as diverting members 30a, 30b . . . 30n reciprocate up and down.

Figure 13:
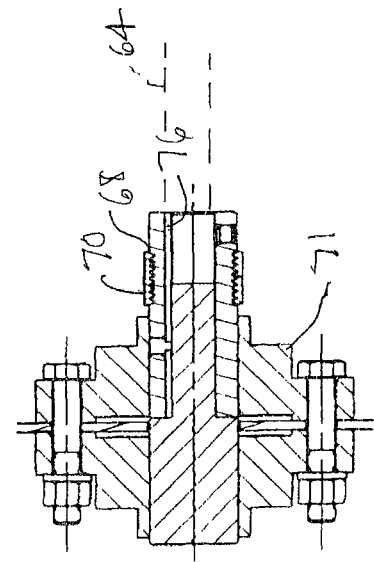
FIG. 13 is a sectional view taken along the lines XIII-XIII in FIG. 11.

In the illustrated embodiment, coupling 62 includes a flexible shaft 64, although other forms of coupling, such as a spline, may be used. Flexible shaft 64 may be a twisted power wire core with a covering of the type that is commercially available, such as from Otto Suhner AG of Brugg Switzerland. Coupling 62 of propulsion system 58 further includes a takeoff assembly 66 between flexible shaft 64 and motor 60 (FIG. 13). Takeoff assembly 66 may include a socket 72 connected with the output shaft 74 of motor 60 for coupling to one end of flexible shaft 64. Alternatively, takeoff assembly 66 may include a sheave 68 that is rotatably supported by a bearing assembly 71 and connected with an end of flexible shaft 64 via a socket 76. A high torque drive 70 between output shaft 74 of motor 60 and sheave 68 rotates socket 76 and, hence, flexible shaft 64. The other end of flexible shaft 64 is connected with socket 56 of shaft 52. In the illustrated embodiment, high torque drive 70 is in the form of a cog belt, but could, alternatively, be a chain, or the like.

Figure 15:
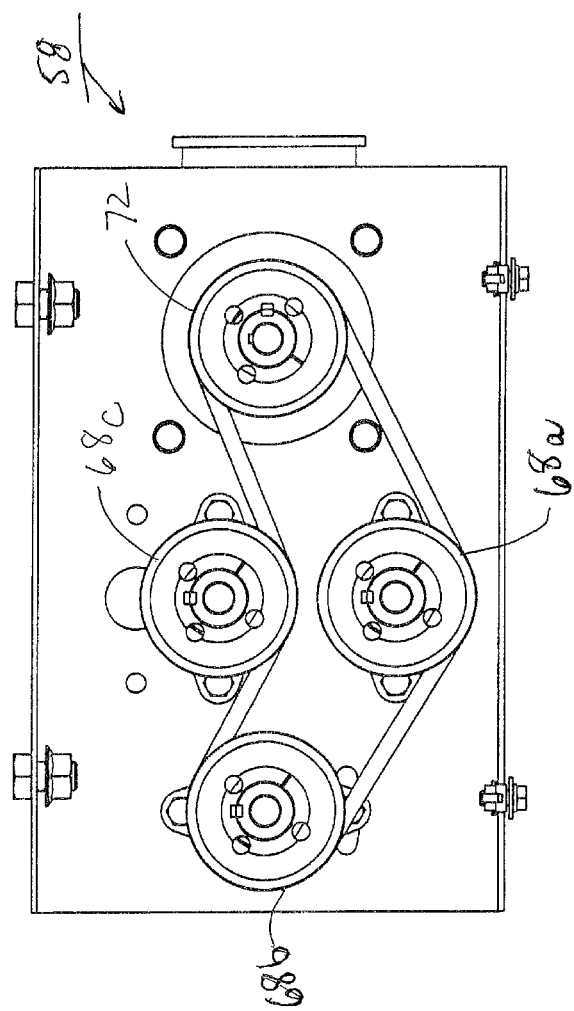
FIG. 15 is the same view as FIG. 11 of an alternative embodiment thereof.
Figure 16:
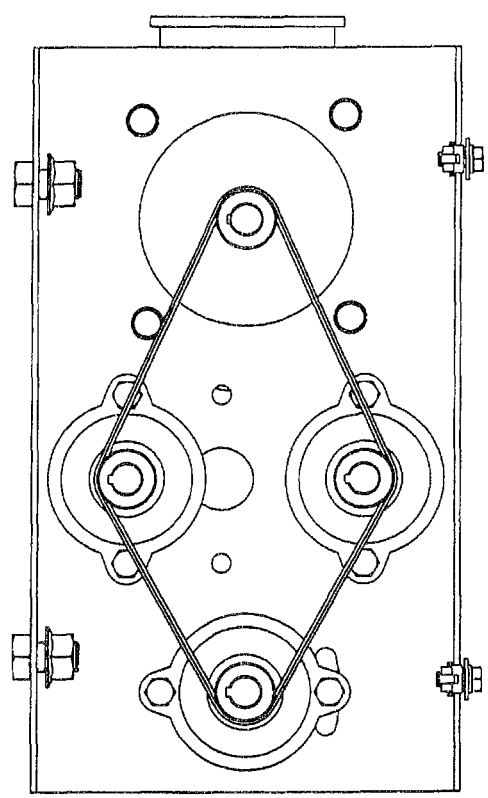
FIG. 16 is the same view as FIG. 11 of another alternative embodiment thereof.
Figure 23:
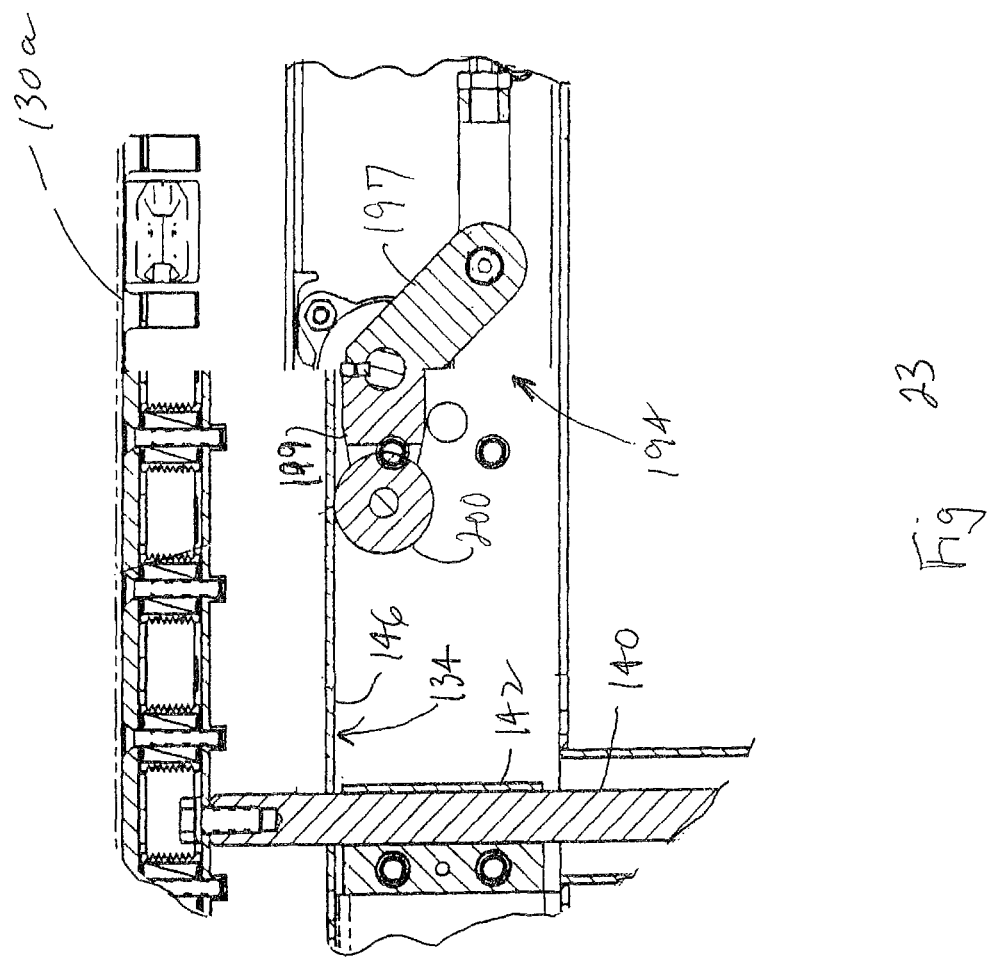
FIG. 23 is an enlarged elevation of the area indicated at XXIII in FIG. 22.
Figure 24:
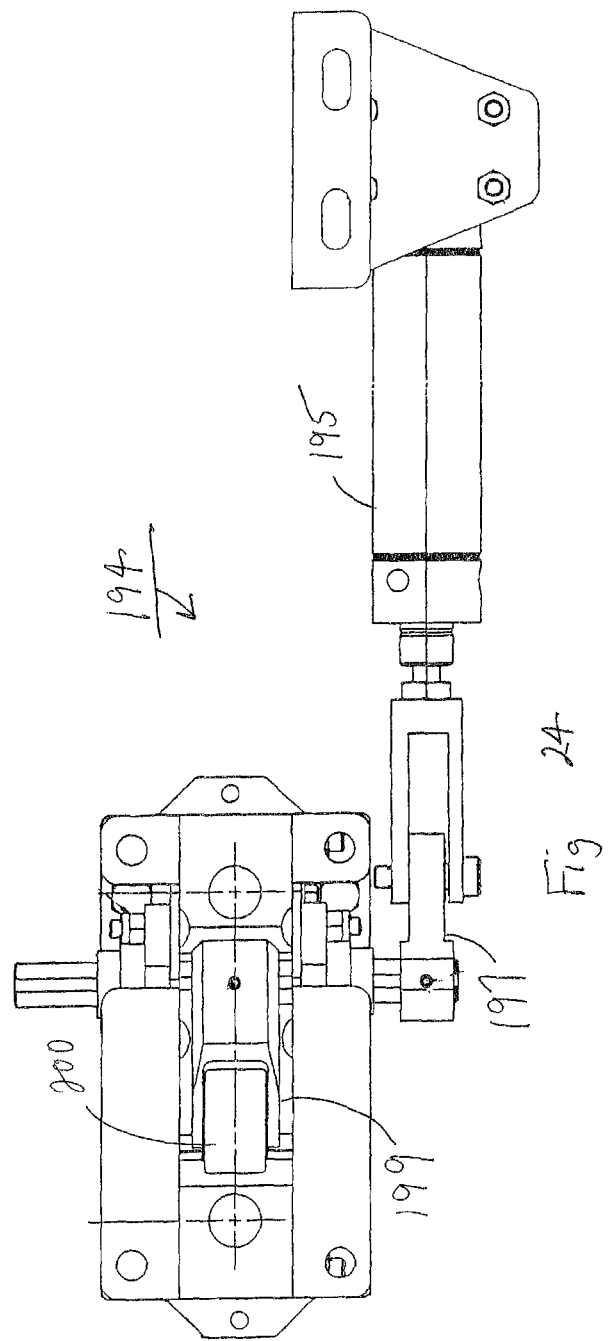
FIG. 24 is a top plan view of an actuator.
Figure 29:
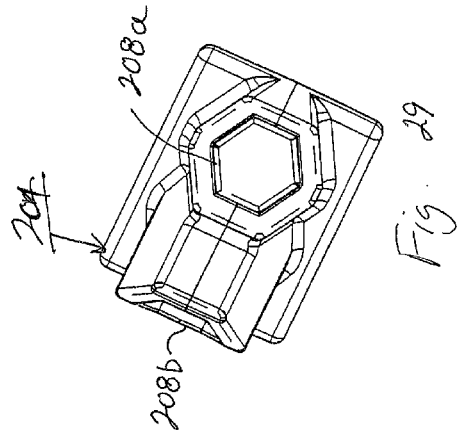
FIG. 29 is a side elevation of the axle retainer in FIG. 27.
Figure 30:
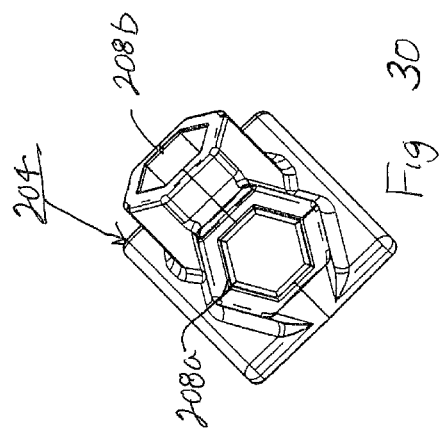
FIG. 30 is another perspective view of the axle retainer in FIG. 27 taken from a different direction.
Figure 27:
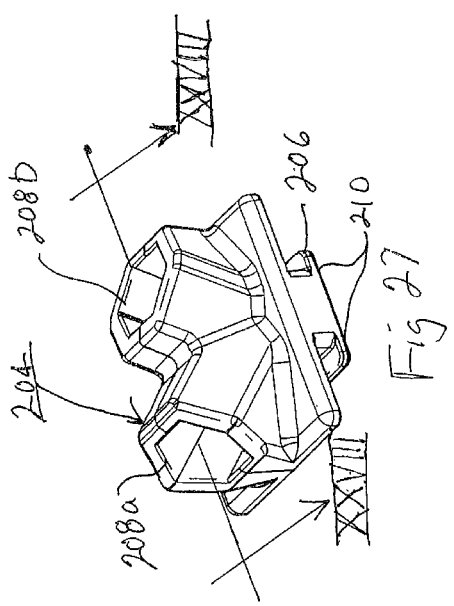
FIG. 27 is a perspective view of an axle retainer.
Figure 28:
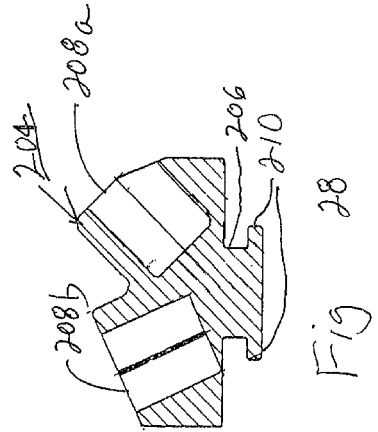
FIG. 28 is a sectional view taken along the lines XXVIII-XXVIII in FIG. 27.

If diverting assembly 26 is made up of a plurality of diverting members 30a, 30b, . . . 30n, each having a driven vertically oriented belt 32, propulsion system 58 includes a plurality of flexible shafts 64, each driving the vertical belt 32 for one of diverting members 30a, 30b. In such arrangement, propulsion system 58 includes a socket 72 connected directly to the output shaft 74 of motor 60 and a sheave 68, each connected with one of one of flexible shafts 64. Should it be desired to have more than two diverting members, additional flexible shafts and additional sheaves 68 may be provided in propulsion system 58 and connected with output shaft 74 of motor 60 via high torque drive 70, as illustrated in FIGS. 15 and 16. Moreover, a flexible shaft 64 may be used to drive an adjacent conveyor. For example, a flexible shaft may be used to drive powered, or driven, takeaway conveyor 28 adjacent conveying surfaces 24 by another one of flexible shafts 64 connected with another socket 72 that is powered by high torque drive 70.

Alternatively, a flexible shaft may be used to drive a conveyor upstream or downstream of conveyor system 20. In this manner, one motor 60 can be used to drive multiple conveying members. This reduces system cost by reducing electrical wiring, and the like. Also, it allows transmission through congested areas of the system. If it be desired to drive one of the multiple conveying members in an opposite direction, high torque drive 70 may be reeved differently as illustrated in FIG. 15 in which a sheave 68c is shown reeved to rotate in a different direction from sheaves 68a and 68b. Also, if desired, a socket 76 and flexible shaft 64 could extend in an opposite direction from bearing assembly 71. Also, if it be desired to drive one flexible shaft 64 at a different speed from other flexible shafts, the diameter of sheave 68 could be selected in a manner that would be understood by the skilled artisan. Also, one or more sheaves 68 could incorporate an electrically operated clutch in order to allow control 98 to selectively rotate the associated flexible shaft 64.

In the illustrated embodiment, conveying surface 24 is a powered roller conveying surface. It should be understood that other types of conveying surfaces, such as provided by gravity conveyor, belt conveyor, or the like, may be used. Conveying surface 24 is defined by a plurality of rollers 78 upstream and downstream of diverting assembly 26. Conveying surface 24 is further defined by a plurality of rollers 80a on one lateral side of diverting assembly 26 and a plurality of rollers 80b on an opposite lateral side of diverting assembly 26. Rollers 80a and 80b are of various lengths to accommodate the diagonal orientation of diverting assembly 26. Guide frame 36 includes a series of tabs 82, each defining a hexagonal hole 84 to receive the axle of one end of rollers 80a, 80b with an opposite end of the rollers mounted to side frame members 23. Rollers 78 and either rollers 80a or 80b are propelled by a roller drive system 85 made up of an endless belt 86 of the type marketed by the Nitta Corporation. Belt 86 may propel the rollers utilizing the principles disclosed in commonly assigned U.S. Patent Application Publication No. 2009/0101475 entitled ROLLER TRANSPORT CONVEYOR AND METHOD, the disclosure of which is hereby incorporated herein by reference. Roller drive system 85 may further include a secondary endless belt 88 and a transfer roller 90. The rollers 80a, 80b that are not propelled by belt 86 may be propelled by secondary endless belt 88, again using the principles disclosed in the '475 patent application publication. However, secondary endless belt 88 may be propelled by transfer roller 90 that transfers the motion of endless belt 86 to belt 88. Transfer roller 90 is rotated by a power tap off 92 utilizing the principles disclosed in commonly assigned patent application Ser. No. 12/891,868, filed Sep. 28, 2010, by Brayman et al. for a BELT DRIVE CONNECTOR WITH POWER TAP OFF, the disclosure of which is hereby incorporated herein by reference. It should be understood that other techniques could be utilized to propel rollers 78, 80a and 80b, including utilizing motorized rollers, or the like.

As previously set forth, diverting member 30 is guided in vertically reciprocating motion by posts 40 riding in blocks 42. Diverting member 30 is elevated by at least one actuator 94 between guide frame 96 and base 34. In the illustrated embodiment, actuator 94 is a pneumatic cylinder that is controlled by a pneumatic valve 96 that responds to electrical signals from a control 98. However, actuator 94 could be an electrical solenoid, hydraulic cylinder, or the like.

Operation of conveyor system 20 is as follows. With articles being transported by conveying surface 24, a higher level control instructs control 98 to transfer a particular article to takeaway conveyor 28. The article may be identified by a bar code, an RFID tag, or the like, on the article. When the article approaches diverting assembly 26, as sensed by an article sensor of the type known in the art, one or more diverting members 30a, 30b . . . 30n are elevated by actuator (s) 94. Vertical transfer belt 32 may be continuously running so that, when the article makes contact with diverting assembly 26, the forward motion of the article being propelled by conveying surface 24 in combination with the motion of transfer belt 32 laterally displaces the article across conveying surface 24 onto takeaway conveyor 28. However, belt 32 could, alternatively, be powered only when needed to make a divert.

While two or more diverting members 30 may be actuated concurrently, articles may be spaced even closer together if they are actuated and deactuated sequentially as follows. By reference to FIGS. 17a and 17b, a leading article designated A is shown as not being diverted and, therefore, passes over diverting assembly 26 which remains retracted. Once article A passes upstream diverting member 30a, diverting member 30a is actuated in order to initiate the divert of an article B, as seen in FIG. 17a. Upstream diverting member 30a can be actuated even though article A is still positioned over downstream diverting member 30b. After article A clears both diverting members 30a, 30b, the downstream diverting member 30b is actuated to complete the diverting of article B, as seen in FIG. 17b. Once downstream diverting member 30b takes over the diverting of article B, upstream diverting member 30a can be retracted as also seen in FIG. 17b. This allows an article C to follow closer to article B than if upstream diverting member 30a were to remain actuated until article B is fully diverted because article C can pass over retracted upstream diverting member 30a while downstream diverting member 30b is completing the diverting of article B.

As is understood by the skilled artisan, the throughput of a conveyor system is inversely proportional to the gaps between articles. By allowing articles to be conveyed closer together, conveyor system 20 provides an increase in throughput as a result of the independent sequential operation of diverting members 30a, 30b. In the illustrated embodiment, conveyor system 20 may be capable of sorting up to about 40 standard cartons per minute (CPM) with diverting members 30a, 30b actuated together and up to about 80 CPM with diverting members 30a, 30b actuated sequentially in the manner previously described. While only two diverting members 30a, 30b are illustrated, three or more may be utilized to provide an even greater control over article diverting and thereby smaller article spacing.

Other applications for conveyor system 20 are possible. For example, by providing diverting members 30a, 30b . . . 30n in different lengths and arranging them in parallel rather than in line with each other, they may be used to provide center alignment of articles being inducted, for example, to a bidirectional sorter. Such sorters sort articles traveling down the middle of the sorter rather than being justified to one side of the sorter. The diverting members may be selectively actuated, such as based on the size and location of an article to displace the article toward the center of the conveying surface. Other applications will be apparent to the skilled artisan.

In an alternative embodiment, a conveyor system 120 includes a conveyor 122 that has a conveying surface 124 for conveying articles in a longitudinal direction and a diverting assembly 126 positioned diagonally across conveying surface 124 (FIGS. 18-29). Diverting assembly 126 travels, or reciprocates, generally vertically between a non-actuated position, similar to diverting member 30a illustrated in FIG. 1, below conveying surface 124 and an actuated position, similar to diverting member 30b illustrated in FIG. 1, extending above conveying surface 124. Diverting assembly 126 is configured to laterally displace articles that are being conveyed on conveying surface 124 when the diverting assembly is in its actuated position. It may be used to reposition articles on the conveying surface or it may be used to divert articles off the conveying surface to a takeaway spur, such as a takeaway powered conveyor 128. While two takeaway conveyors 128 are shown on opposite lateral sides of conveying surface 124 in FIG. 19, it should be understood that the embodiment illustrated in FIG. 19 is typically only capable of diverting in one lateral direction or the other depending upon the direction of movement of conveying surface 124.

In the illustrated embodiment, diverting assembly 126 is at an angle of 30 degrees from the longitudinal direction of travel of conveying surface 124, as illustrated in FIGS. 18 and 19. However, it may be at any desired angle, such as between 20 degrees and 45 degrees, or the like, as will be discussed in more detail below. While conveyer system 120 is illustrated for use with distribution of articles, such as cases of goods being shipped, for example, from warehouses to retail outlets, it can also be used in parcel applications, such as express shipping, as well as user-packed luggage sortation at airports, and the like.

Diverting assembly 126 includes one or more diverting members 130a, 130b . . . 130n each having a vertical diverting surface, which may be a powered diverting surface, such as a powered vertically oriented belt 132. Alternatively, diverting member 130 may have a passive diverting surface, such as free-running wheels, an anti-friction surface, or the like. If a powered diverting surface is used, the speed of the diverting surface may have a longitudinal component that has approximately the same speed as that of conveying surface 124 in order to maintain the forward velocity of articles being diverted. Each diverting assembly 126 includes a base 134 that vertically reciprocates in a guide frame 136 and a plurality of rollers 138 supported by base 134. Rollers 138 reeve vertical belt 132 and provide support or backing to the belt when contacted by an article being diverted. Each diverting member 130 includes a plurality of vertically oriented posts 140 extending downwardly from base 134 and a plurality of stationary blocks 142, made from a polymer, such as UHMW, or the like, mounted to guide frame 136, each for facilitating vertical reciprocating motion of one of posts 140. Base 134 includes an upper plate 144 and a lower plate 146 interconnected by one or more sidewalls 147. Each post 140 passes through an opening in lower plate 146 sized just larger than the post and is connected with upper plate 144. This provides spaced apart support to posts 140 to be able to withstand the shock of contact by the articles against diverting member 130.

Diverting member 130 is elevated by an actuator 194 between guide frame 136 and base 134. In the illustrated embodiment, actuator 194 includes a pneumatic cylinder 195 that is controlled by a pneumatic valve that may be similar to valve 96 that responds to electrical signals from a control, similar to control 98. However, actuator 194 could be an electrical solenoid, hydraulic cylinder, or the like, instead of pneumatic cylinder 195.

Actuator 194 rotates an arm 197 which is capable of applying controlled acceleration to base 134 during both the raising and lowering of diverting member 130. A terminal end 199 of arm 197 translates the linear motion of cylinder 195 to a sinusoidal motion, which is applied to base 134 via a roller 200. More particularly, even if the linear motion of cylinder 195 involves an abrupt acceleration, the vertical motion imparted to base 134 by arm 197 will have limited acceleration according to a sinusoidal function, as would be understood by the skilled artisan.

Rollers 138 are mounted to upper plate 144. One of the rollers is a drive roller 148 for propelling belt 132. Roller 148 is supported by an arm 150 supported by sidewalls 147. Roller 148 is an extension of a shaft 152 that is rotatably supported by a pair of bearings 154 to arm 150. An opposite end of shaft 152 defines a socket 156 whose purpose will be explained in more detail below. A tensioner 151 applies outward force on arm 150 in order to apply a tension on belt 132. Roller 148, and, hence, the diverting surface defined by belt 132, may be driven by a propulsion system of the same type as propulsion system 58.

In the illustrated embodiment, diverting assembly 126 is made up of a plurality of diverting members 130a, 130b, each having a driven vertically oriented belt 132. In such arrangement, the propulsion system includes a plurality of flexible shafts 164, each driving the vertical belt 132 for one of diverting members 130a, 130b. In the illustrated embodiment, conveying surface 124 is a powered roller conveying surface. It should be understood that other types of conveying surfaces, such as provided by a gravity conveyor, belt conveyor, or the like, may be used. Conveying surface 124 is defined by a plurality of rollers 178 upstream and downstream of diverting assembly 126. Conveying surface 124 is further defined by a plurality of rollers 180a on one lateral side of diverting assembly 126 and a plurality of rollers 180b on an opposite lateral side of diverting assembly 126 that are similar to rollers 80a and 80b. Rollers 180a and 180b are of various lengths to accommodate the diagonal orientation of diverting assembly 126. Rollers 178 and either rollers 180a or 180b may be propelled by a roller drive system 185 including an endless belt 186 that is similar to belt 86 and which may be driven in the manner previously described with respect to belt 86. Roller drive system 185 may further include a secondary endless belt 188. The rollers 180a, 180b that are not propelled by belt 186 may be propelled by secondary endless belt 188 that is similar to belt 88 and driven in a similar manner as previously described. Operation of conveyor system 120 is similar to the operation of conveyor system 20 as previously described.

Each roller 180a, 180b includes an axle, or portion of an axle, extending from each end thereof. The axle on one end is received in an opening, such as a hexagonally shaped opening 202 in a side frame member. The axle on the other end of each roller 180a, 180b is supported by an axle retainer 204. Axle retainer 204, which may be molded from a conventional polymeric material, has a base 206 that is adapted to be mounted to a frame, such as guide frame 136 that is on opposite sides of diverting members 130a, 130b. Each axle retainer further includes two or more axle retaining openings 208a, 208b extending from base 206. Each axle retaining opening 208a, 208b is adapted to receiving an end of one of the axles extending from a roller 180a, 180b. Each of the axle retaining openings 208a, 208b is at a different angle to said base. In this manner, axle retainers 204 are capable of mounting rollers at more than one angle to guide frame 136. This allows diverting assembly 126 to be mounted at different divert angles with respect to conveying surface 124 merely by changing which axle retaining opening 208a, 208b that is used to support the axles at one end of rollers 180a, 180b. Which axle retaining opening 208a, 208b that is used can be selected by how each axle retainer 204 is oriented.

Axle retainers 204 and guide frame 136 have complimentary surfaces that allow the axle retainers to be mounted at different orientations to the guide frame to change which of the retaining openings is used to retain one of said axles. The complementary surfaces are made up of T-shaped extensions 210 of base 206 of the axle retainers and vertical slots 212 in the guide frame to receive extensions 210. The T-shaped extensions are press-fit into slots 212 in order to retain axle retainers 204 connected to guide frame 136. Thus, with one portion of base 206 pointing upwardly, one axle retaining opening 208a, 208b will be positioned to receive a roller axle. With the opposite portion of base 206 pointed upwardly, the other axle retaining opening 208a, 208b will be positioned to receive the roller axle.

Figure 32:
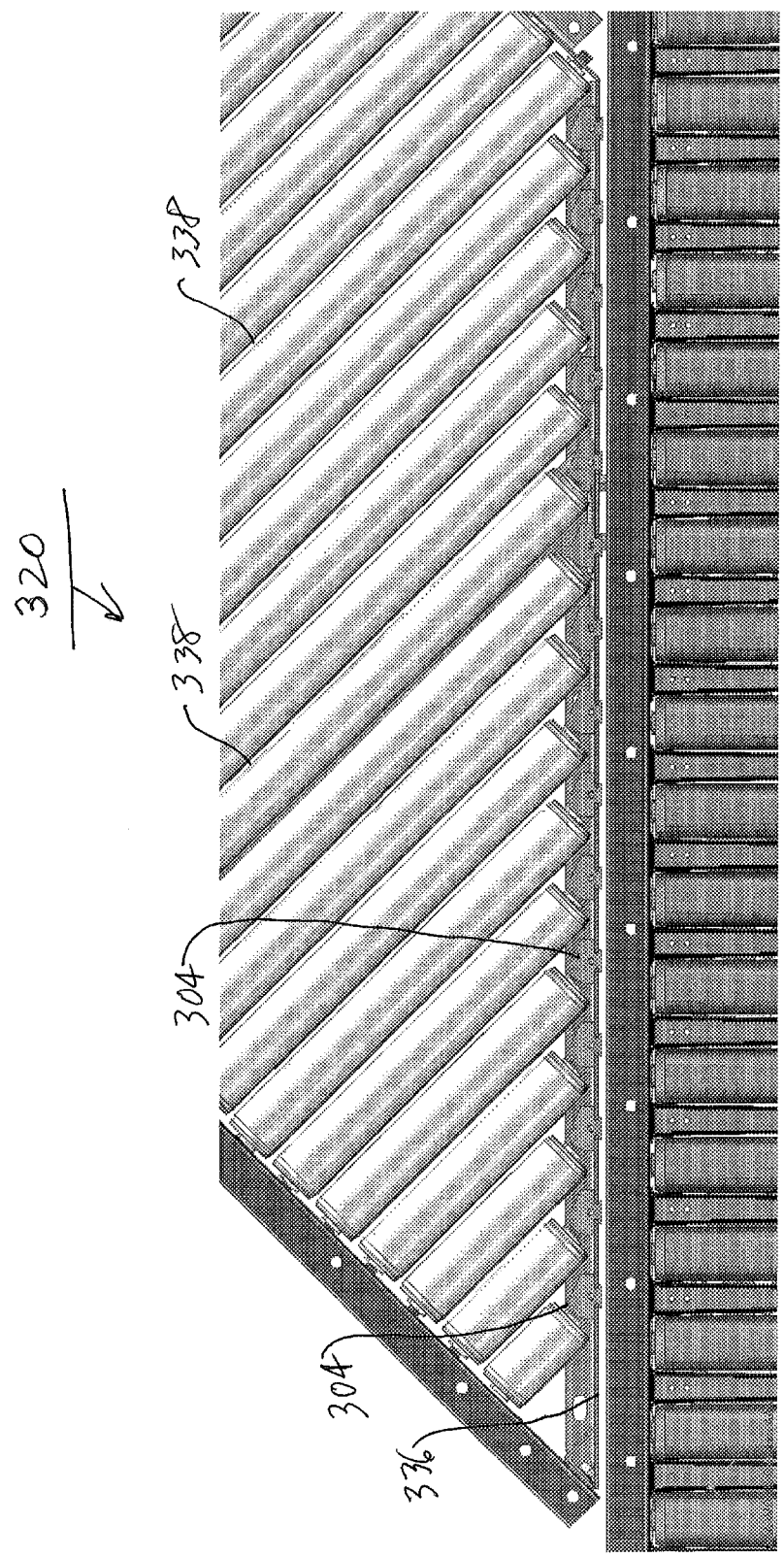
FIG. 32 is a top plan view of the conveyor system in FIG. 31.

It should be understood that axle retainers may find application other than with a diverting assembly 216. For example, axle retainers 304 are shown in an application in a conveyor 320 where rollers 338 are placed an different angles with respect to a conveyor side frame 336, such as when skewed rollers are used such as for unscrambling or aligning conveyors (FIGS. 31-33). Axle retainers 304 may conveniently include a fastener portion, such as an opening 339 that receives other fastener portions, such as threaded fasteners 341 to retain, for example, a finger guard 343. Other applications will be apparent to the skilled artisan.

Figure 34A:
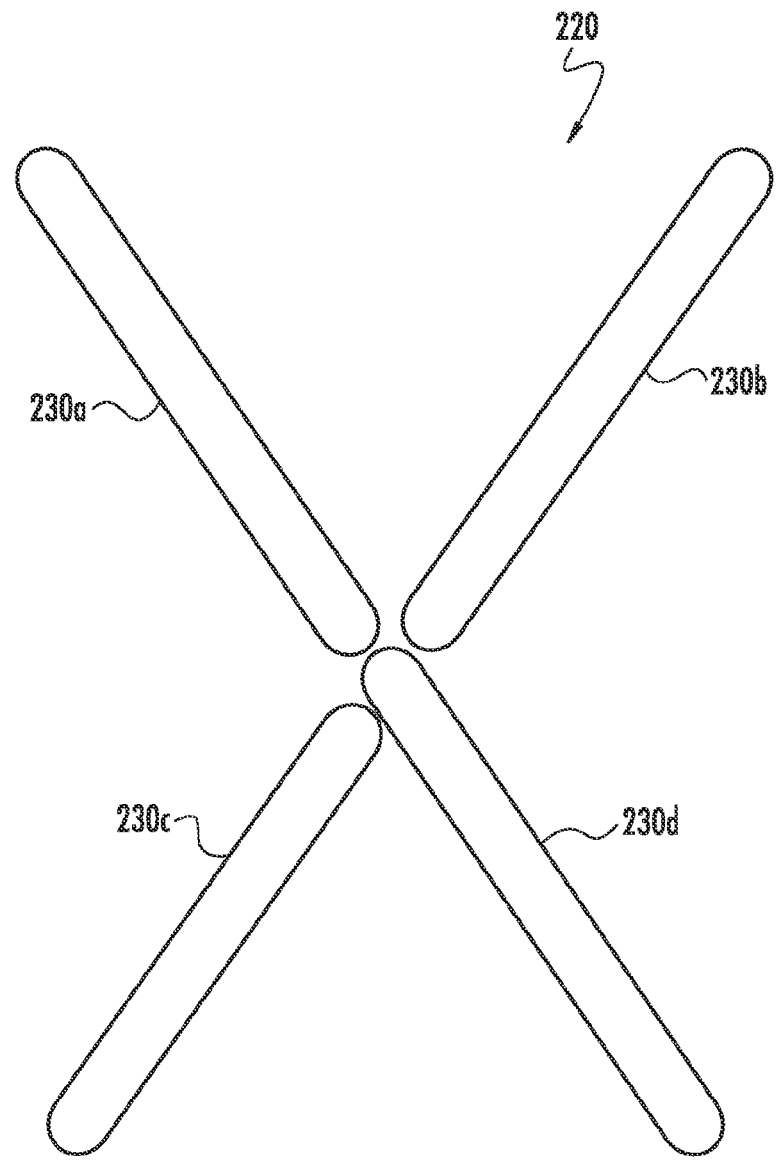
FIGS. 34a-34c are a top plan view of another alternative embodiment of a conveyor system showing various modes of operation thereof.

In an alternative embodiment, a conveyor system 220 is capable of bidirectional diverting to opposite lateral sides of a conveyor. Conveyor system 220 includes a plurality of diverting members 230a, 230b, 230c and 230d that are arranged in a generally "X" pattern (FIG. 34a). These include a plurality of upstream diverting members 230a, 230b and a plurality of downstream diverting members 230c, 230d. Upstream diverting members 230a, 230b diverge upstream from each other and downstream diverting members 230b, 230d diverge downstream thereby defining a cross configuration, namely the "X" pattern. A control diverts articles laterally in one direction by actuating one side of the cross configuration defined by one of said upstream diverting members 230a or 230b and an aligned one of the downstream diverting members 230c or 230d. The control diverts articles laterally in an opposite direction by actuating the other side of said cross configuration defined by the other of the upstream diverting members 230a or 230b and an aligned other of the downstream diverting members 230c or 230d. However, in the illustrated embodiment, a portion of one of the diverting members, such as diverting member 230d is partially positioned between aligned ones of the diverting members, such as diverting members 230b and 230c.

Figure 34B:
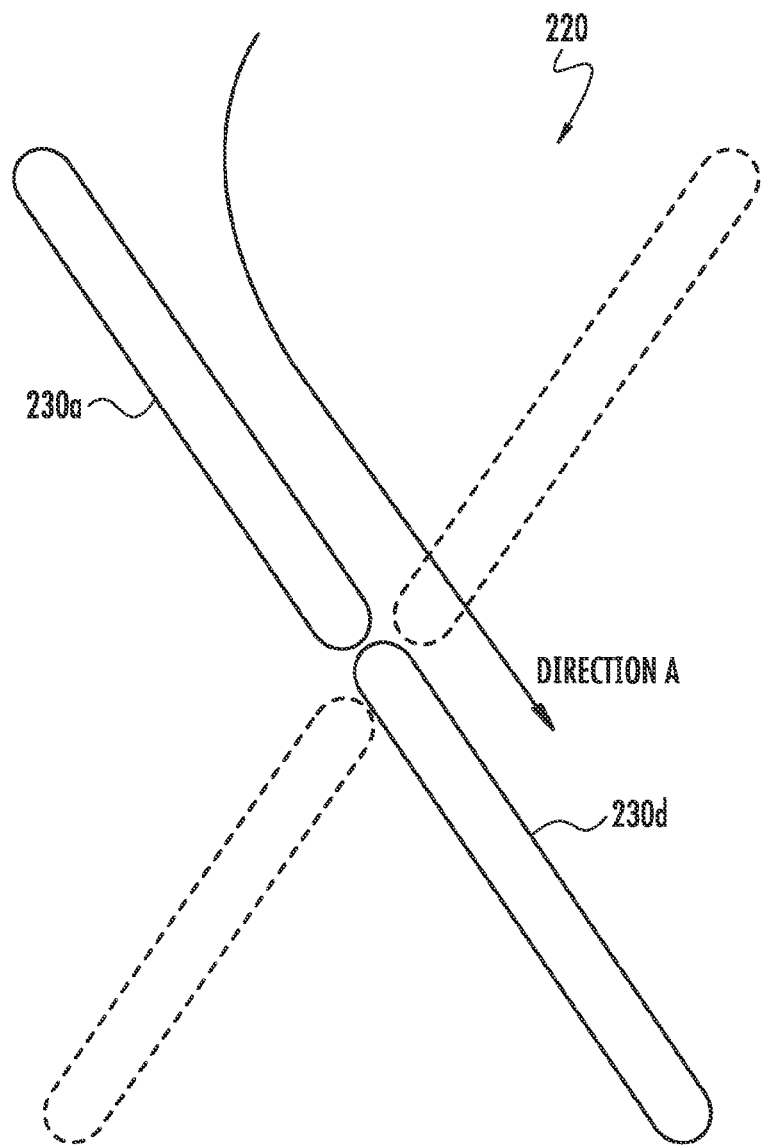
Figure 34C:
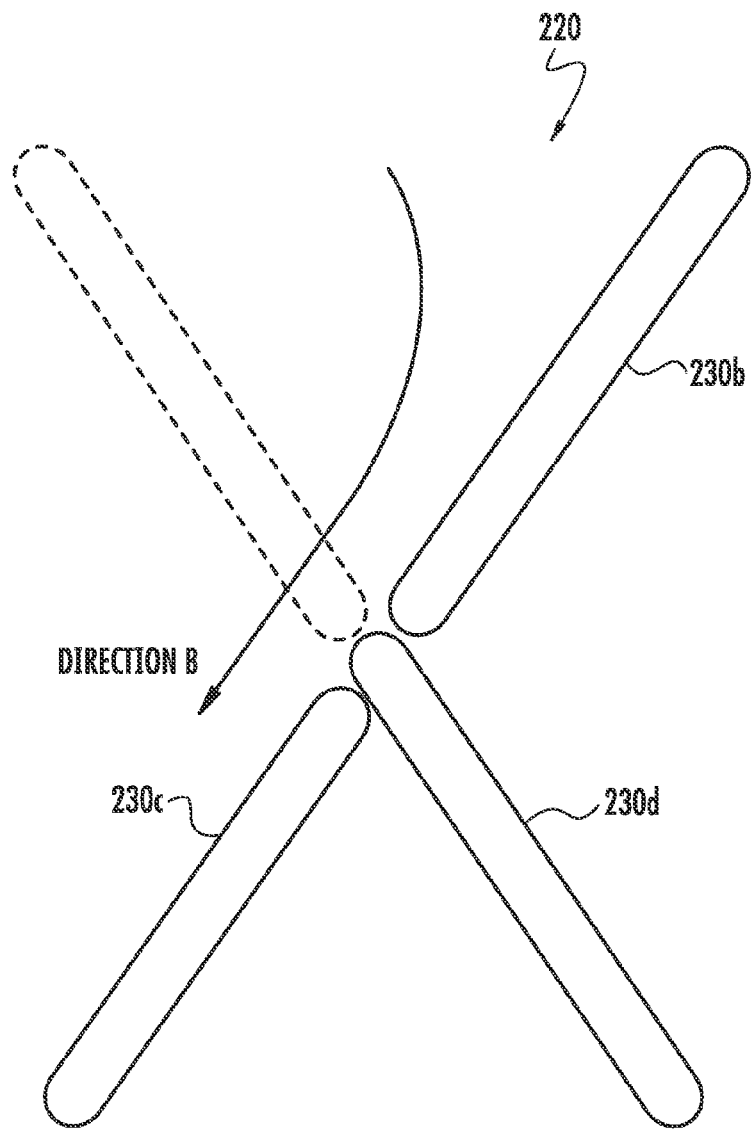

In this embodiment of conveyor system 220, the control diverts articles laterally in direction A by actuating aligned diverting members 230a and 230d (FIG. 34b). However, the control diverts articles laterally in the opposite direction B by actuating upstream diverting member 230b, aligned downstream diverting member 230c and the other downstream diverting member 230d (FIG. 34c). The purpose of extending a portion of diverting member 230d between aligned diverting members 230b and 230c is to fill the gap between diverting members 230b, 230c that would otherwise be created by the four diverting members coming together at one point. It would be understood by the skilled artisan that this technique could be accomplished by extending either downstream diverting members 230c or 230d between the opposite aligned diverting members.

In yet a further embodiment, a conveyor system 320 includes a conveying surface 324 and a diverting assembly 326 having one or more diverting members 330a, 330b that are otherwise similar to those previously described (FIG. 35). Conveying surface 324 is made up of rollers 380a and 380b that are driven by a roller drive system 385. Roller drive system 385 is made up of a plurality of motorized rollers 387 that are mounted transverse to rollers 380a, 380b and drive rollers 380a, 380b via O-rings 389 using the principles disclosed in commonly assigned U.S. Pat. No. 7,383,935 entitled MOTORIZED ROLLER TRANSVERSE DRIVE, the disclosure of which is hereby incorporated herein by reference.

Changes and modifications in the specifically described embodiments can be carried out without departing from the principles of the invention. For example, the diverting assembly could be supplied in kit form to be applied to an existing conveyor system. The invention is intended to be limited only by the scope of the appended claims, as interpreted according to the principles of patent law including the doctrine of equivalents.

The embodiments of the invention in which an exclusive property or privilege is claimed are defined as follows:

1. A conveyor system, comprising:
   a conveying surface for conveying articles, said conveying surface defined by a plurality of rollers, each of said rollers comprising an axle;
   a frame made up of at least two frame members that are spaced apart a distance that corresponds with a length of at least one of said plurality of rollers; and
   a plurality of axle retainers connected with at least one of said frame members, each of said axle retainers having a base and a plurality of axle retaining openings that are each adapted to receiving said axle at an end of one of said rollers, at least two of said openings being fixedly at different angles to said base, wherein said axle retainers are capable of mounting said rollers at more than one angle with respect to said at least one of said frame members as determined by which of said axle retaining openings receives said axle, each of said more than one mounting angle of said rollers corresponding to a different orientation of said base with respect to said at least one of said frame members.

2. The conveyor system as claimed in claim 1 wherein said axle retainers and said at least one of said frame members have complimentary configurations that allow said axle retainers to be mounted at different orientations to said at least one of said frame members to change which of said retaining openings is used to retain one of said axles.

3. The conveyor system as claimed in claim 2 wherein said complementary configurations comprise T-shaped extensions of said axle retainers and vertical slots in said at least one of said frame members to receive said extensions.

4. The conveyor system as claimed in claim 3 wherein said T-shaped extensions are press-fit into said slots in order to maintain said axle retainers connected to said at least one of said frame members.

5. The conveyor system as claimed in claim 1 including a vertically reciprocating diverter that reciprocates between a non-diverting position below said conveying surface and a diverting position at least partially above said conveying surface, wherein said at least one of said frame members extends along at least one side of said diverter wherein said diverter can be mounted at different angles with respect to said conveying rollers.

6. The conveyor system as claimed in claim 1 wherein said rollers are skewed with respect to both of said frame members.

7. The conveyor system as claimed in claim 6 that comprises at least one chosen from an unscrambling conveyor and an aligning conveyor.

8. The axle retainer as claimed in claim 1 wherein each of said openings comprises a hexagonally shaped opening.

9. The conveyor system as claimed in claim 1 wherein said axle retainers are made from a polymeric material.

10. An axle retainer, comprising:
a base; and
a plurality of axle-retaining openings that are each adapted to receiving an end of a roller axle, at least two of said openings being fixedly at different angles to said base, whereby said axle retainers are capable of mounting rollers at more than one angle to said base as determined by which of said at least two openings is receiving the axle, which of said at least two openings is receiving the axle is determined by an orientation of said base.

11. The axle retainer as claimed in claim 10 wherein each of said openings comprises a hexagonally shaped opening.

12. The axle retainer as claimed in claim 10 that is made from a polymeric material.

13. The axle retainer as claimed in claim 10 including a mounting surface of said base opposition from said openings.

14. The axle retainer as claimed in claim 13 wherein said mounting surface is defined by extensions of said base.

15. The axle retainer as claimed in claim 14 wherein said extensions comprise T-shaped extensions.

* * * * *